US007171246B2

(12) United States Patent
Mattila et al.

(10) Patent No.: US 7,171,246 B2
(45) Date of Patent: Jan. 30, 2007

(54) NOISE SUPPRESSION

(75) Inventors: Ville-Veikko Mattila, Tampere (FI); Erkki Paajanen, Tampere (FI); Antti Vähätalo, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 10/888,261

(22) Filed: Jul. 9, 2004

(65) Prior Publication Data

US 2005/0027520 A1 Feb. 3, 2005

Related U.S. Application Data

(63) Continuation of application No. 09/713,767, filed on Nov. 15, 2000, now Pat. No. 6,810,273.

(30) Foreign Application Priority Data

Nov. 15, 1999 (FI) ................................. 19992452

(51) Int. Cl.
*H04B 1/38* (2006.01)
*H04B 3/20* (2006.01)
*H04M 1/00* (2006.01)

(52) U.S. Cl. ..................... 455/570; 455/63.1; 455/296; 370/286; 379/392.01

(58) Field of Classification Search ................ 455/570, 455/63.1, 67.13, 114.2, 222, 223; 379/392.01; 381/94.1, 94.2–94.9; 704/203, 204, 226, 704/269

See application file for complete search history.

(56) References Cited

U.S. PATENT DOCUMENTS 5,299,118 A * 3/1994 Martens et al. ............. 600/509
5,550,924 A * 8/1996 Helf et al. ................. 381/94.3
5,771,440 A 6/1998 Sukhu et al. ................. 455/63
5,867,574 A 2/1999 Eryilmaz .................... 379/389
5,907,624 A * 5/1999 Takada ....................... 381/94.2
6,028,549 A * 2/2000 Buckreuss et al. .......... 342/159
6,070,137 A 5/2000 Bloebaum et al. .......... 704/227

(Continued)

FOREIGN PATENT DOCUMENTS

EP 0 790 599 B1 11/1996

(Continued)

OTHER PUBLICATIONS

Unknown Author, “Spectral Analysis : Smoothed Priodogram Method”, Notes_6, GEOS 585 A, Spring 2005, pp. 1-10.*

(Continued)

*Primary Examiner*—Duc M. Nguyen
(74) *Attorney, Agent, or Firm*—Perman & Green, LLP

(57) ABSTRACT

A method of noise suppression to suppress noise in a signal containing background noise (314) in a communications path between a cellular communications network and a mobile terminal. The method comprises the steps of:

estimating and up-dating a spectrum of the background noise (332, 334);

using the background noise spectrum to suppress noise in the signal;

generating an indication to indicate the operation of at least one of a discontinuous transmission unit (DTX) and a bad frame handling unit (BFI); and freezing estimating and up-dating of the spectrum of the background noise when the indication is present.

29 Claims, 6 Drawing Sheets

U.S. PATENT DOCUMENTS

| | | | | |
|---|---|---|---|---|
| 6,088,327 | A * | 7/2000 | Muschallik et al. | 370/210 |
| 6,266,633 | B1 * | 7/2001 | Higgins et al. | 704/224 |
| 6,282,176 | B1 | 8/2001 | Hemkumar | 370/276 |
| 6,526,140 | B1 | 2/2003 | Marchok et al. | 379/406 |
| 6,526,378 | B1 * | 2/2003 | Tasaki | 704/224 |
| 6,629,068 | B1 * | 9/2003 | Horos et al. | 704/228 |
| 6,810,273 | B1 * | 10/2004 | Mattila et al. | 455/570 |
| 6,838,877 | B2 * | 1/2005 | Heid et al. | 324/307 |
| 6,928,048 | B1 * | 8/2005 | Do et al. | 370/208 |
| 2002/0156623 | A1 * | 10/2002 | Yoshida | 704/226 |

FOREIGN PATENT DOCUMENTS

| | | |
|---|---|---|
| WO | WO 99/22116 | 6/1997 |
| WO | WO 98/02979 | 1/1998 |
| WO | WO 99/65266 | 12/1999 |

OTHER PUBLICATIONS

"Numeric Recipes in C: The Art of Scientific Computing", 1998 pp. 414-415.

"IEEE Transactions on Acoustics, Speech and Signal Processing", ASSP-32(6), 1984.

* cited by examiner

NOISE SUPPRESSION

CROSS-REFERENCE TO RELATED APPLICATIONS

This application is a continuation of and claims priority from U.S. patent application Ser. No. 09/713,767, filed Nov. 15, 2000 now U.S. Pat. No. 6,810,273.

FIELD OF THE INVENTION

This invention relates to a noise suppressor and a noise suppression method. It relates particularly to a mobile terminal incorporating a noise suppressor for suppressing noise in a speech signal. A noise suppressor according to the invention can be used for suppressing acoustic background noise, particularly in a mobile terminal operating in a cellular network.

BACKGROUND OF THE INVENTION

One purpose of noise suppression or speech enhancement in a mobile telephone terminal is to reduce the impact of environmental noise on a speech signal and thus to improve the quality of communication. In the case of an up-link (transmission, TX) signal, it is also desired to minimise detrimental effects in the speech coding process caused by this noise.

In face-to-face communication, acoustic background noise disturbs a listener and makes it more difficult to understand speech. Intelligibility is improved by a speaker raising his or her voice so that it is louder than the background noise. In the case of telephony, background noise is troublesome because there is no additional information provided by facial expressions and gestures.

In digital telephony, a speech signal is first converted into a sequence of digital samples in an analogue-to-digital (A/D) converter and then compressed for transmission using a speech codec. The term codec is used to describe a speech encoder/decoder pair. In this description, the term "speech encoder" is used to denote the encoding side of the speech codec and the term "speech decoder" is used to denote the decoding functions of the speech codec. It should be appreciated that a general speech codec may be implemented as a single functional unit, or as separate elements that implement the encoding and decoding operations.

In digital telephony, the deleterious effect of background noise can be great. This is due to the fact that speech codecs are generally optimised for efficient compression and acceptable reconstruction of speech and their performance can be impaired if noise is present in the speech signal, or errors occur in speech transmission or reception. In addition, the presence of noise itself can lead to distortion to the background noise signal when it is encoded and transmitted.

Impaired performance of a speech codec reduces both the intelligibility of the transmitted speech and its subjective quality. Distortion of the transmitted background noise signal degrades the quality of the transmitted signal, making it more annoying to listen to and rendering contextual information less recognisable by changing the nature of the background noise signal. Consequently, work in the field of speech enhancement has concentrated on studying the effect of noise on speech coding performance and producing pre-processing methods to reduce the impact of noise on speech codecs.

The problems discussed above relate to arrangements in which only one microphone is present to provide only one signal. In such arrangements a noise suppressor is provided which can interpret the one-channel signal to decide which parts of it represent underlying speech and which represent noise.

When a digital mobile terminal receives an encoded speech signal, it is decoded by the decoding part of the terminal's speech codec and supplied to a loudspeaker or earpiece for the user of the terminal to hear. A noise suppressor may be provided in the speech decoding path, after the speech decoder, in order to reduce the noise component in the received and decoded speech signal. However, in noisy conditions the performance of the speech decoder may be affected detrimentally, resulting in one or more of the following effects:

1. The speech component of the signal may sound less natural or harsh, as critical information required by the speech codec in order to correctly decode the speech signal is altered by the presence of noise.
2. The background noise may sound unnatural because codecs are generally optimised for compressing speech rather than noise. Typically this gives rise to increased periodicity in the background noise component and may be sufficiently severe to cause the loss of contextual information carried by the background noise signal.

Information about an encoded speech signal may also be lost or corrupted during transmission and reception, for example due to transmission channel errors. This situation may give rise to further deterioration in the speech decoder output, causing additional artefacts to become apparent in the decoded speech signal. When a noise suppressor is used in the speech decoding path, after a speech decoder, non-optimal performance of the speech decoder may in turn cause the noise suppressor to operate in a less than optimal manner.

Therefore special care must be taken when implementing noise suppressors intended to operate on decoded speech signals. In particular, two conflicting factors have to be balanced. If the noise suppressor provides too much noise attenuation, this may reveal the deterioration in speech quality caused by the speech codec. However, due to the intrinsic properties of typical speech codecs, which are optimised for the encoding and decoding of speech, decoded background noise can sound more annoying than the original noise signal and so it should be attenuated as much as possible. Thus, in practice, it is found that a slightly lower level of noise reduction may be optimal for decoded speech signals, compared with that which can be applied to speech signals prior to encoding.

It is generally desirable that when noise suppression is used during speech encoding and/or decoding, it should reduce the level of background noise, minimise the speech distortion caused by the noise reduction process and preserve the original nature of the input background noise.

An embodiment of a mobile terminal comprising a noise suppressor according to prior art will now be described with reference to FIG. 1. The mobile terminal and the wireless system with which it communicates operate according to the Global System for Mobile telecommunications (GSM) standard. FIG. 1 shows a mobile terminal 10 comprises a transmitting (speech encoding) branch 12 and a receiving (speech decoding) branch 14.

In the transmitting (speech encoding) branch, a speech signal is picked up by a microphone 16 and sampled by an analogue-to-digital (A/D) converter 18 and noise suppressed in a noise suppressor 20 to produce an enhanced signal. This requires the spectrum of the background noise to be estimated so that background noise in the sampled signal can be suppressed. A typical noise suppressor operates in the frequency domain. The time domain signal is first transformed to the frequency domain, which can be carried out efficiently using a Fast Fourier Transform (FFT). In the frequency domain, voice activity has to be distinguished from background noise, and when there is no voice activity, the spectrum of the background noise is estimated. Noise suppression gain coefficients are then calculated on the basis of the current input signal spectrum and the background noise estimate. Finally, the signal is transformed back to the time domain using an inverse FFT (IFFT).

The enhanced (noise suppressed) signal is encoded by a speech encoder 22 to extract a set of speech parameters which are and then channel encoded in a channel encoder 24 where redundancy is added to the encoded speech signal in order to provide some degree of error protection. The resultant signal is then up-converted into a radio frequency (RF) signal and transmitted by a transmitting/receiving unit 26. The transmitting/receiving unit 26 comprises a duplex filter (not shown) connected to an antenna to enable both transmission and reception to occur.

A noise suppressor suitable for use in the mobile terminal of FIG. 1 is described in published document WO97/22116.

In order to lengthen battery life, different kinds of input signal-dependent low power operation modes are typically applied in mobile telecommunication systems. These arrangements are commonly referred to as discontinuous transmission (DTX). The basic idea in DTX is to discontinue the speech encoding/decoding process in non-speech periods. DTX is also intended to limit the amount of data that is transmitted over the radio link during pauses in speech. Both measures tend to reduce the amount of power consumed by the transmitting device. Typically, some kind of comfort noise signal, intended to resemble the background noise at the transmitting end, is produced as a replacement for actual background noise. DTX handlers are well known in the art such as the GSM Enhanced Full Rate (EFR), Full Rate and Half Rate speech codecs.

Referring again to FIG. 1, the speech encoder 22 is connected to a transmission (TX) DTX handler 28. The TX DTX handler 28 receives an input from a voice activity detector (VAD) 30 which indicates whether there is a voice component in the noise suppressed signal provided as the output of the noise suppressor block 20. The VAD 30 is basically an energy detector. It receives a filtered signal, compares the energy of the filtered signal with a threshold and indicates speech whenever the threshold is exceeded. Therefore, it indicates whether each frame produced by the speech encoder 22 contains noise with speech present or noise without speech present. The most significant difficulty in detecting speech in a signal generated by a mobile terminal is that the environments in which such terminals are used often lead to low speech/noise ratios. The accuracy of the VAD 30 is improved by using filtering to increase the speech/noise ratio before the decision is made as to whether speech is present.

Of all the environments in which mobile telephones are used, the worst speech/noise ratios are generally encountered in moving vehicles. However, if the noise is relatively stationary for extended periods, that is, if the noise amplitude spectrum does not vary much in time, it is possible to use an adaptive filter with suitable coefficients to remove much of the vehicle noise.

The noise levels in environments where mobile terminals are used may change constantly. The frequency content (spectrum) of the noise may also change, and can vary considerably depending on circumstances. Because of these changes, the threshold and adaptive filter coefficients of the VAD 30 must be constantly adjusted. To provide reliable detection, the threshold must be sufficiently above the noise level to avoid noise being falsely identified as speech, but not so far above it that low level parts of speech are identified as noise. The threshold and the adaptive filter coefficients are only up-dated when speech is not present. Of course, it is not prudent for the VAD 30 to up-date these values on the basis of its own decision about the presence of speech. Therefore, this adaptation only occurs when the signal is substantially stationary in the frequency domain, but does not have the pitch component inherent in voiced speech. A tone detector is also used to prevent adaptation during information tones.

A further mechanism is used to ensure that low level noise (which is often not stationary over long periods) is not detected as speech. In this case, an additional fixed threshold is used so that input frames having frame power below the threshold are interpreted as noise frames.

A VAD hangover period is used to eliminate mid-burst clipping of low level speech. Hangover is only added to speech-bursts which exceed a certain duration to avoid extending noise spikes. Operation of a voice activity detector in this regard is known in the art.

The output of the VAD 30 is typically a binary flag which is used in the TX DTX handler 28. If speech is detected in a signal, its transmission continues. If speech is not detected, transmission of the noise suppressed signal is stopped until speech is detected again.

In most mobile telecommunication systems, DTX is mostly applied in the up-link connection since speech encoding and transmission is typically much more power consuming than reception and speech decoding, and because the mobile terminal typically relies on the limited energy stored in its battery. During periods in which there is no transmission of a signal supposedly carrying speech, comfort noise is generated to give the listener an illusion that the signal is, in fact, continuous. As described in further detail below, in some cellular telephone systems, comfort noise is generated in the receiving terminal, on the basis of information received from the transmitting terminal describing the characteristics of the noise at the transmitting terminal.

Generally, an explicit flag is provided in the speech decoder indicating whether the DTX operation mode is on or not. This is the case with, for example, all of the GSM speech codecs. Other cases exist, however, for example Personal Digital Cellular (PDC) networks, where a frame repeating mode must be activated in the noise suppressor by comparing input frames to earlier ones and setting up a voice operated switch (VOX) flag if consecutive frames are identical. Furthermore, in a mobile-to-mobile connection, no information is provided in the down-link connection about the occurrence of DTX in the up-link connection.

In some speech codecs, such as the GSM EFR codec, the decision to switch off transmission during pauses in speech is made in a DTX handler of the speech encoder. At the end of a speech burst, the DTX handler uses a few consecutive frames to generate a silence descriptor (SID) frame which is used to carry comfort noise parameters describing estimated background noise characteristics to the decoder. A silence descriptor (SID) frame is characterised by an SID code word.

After transmission of an SID frame, radio transmission is cut and a speech flag (SP flag) is set to zero. Otherwise, the SP flag is set to 1 to indicate radio transmission. The SID frame is received by the speech decoder, which then generates noise with a spectral profile corresponding to the properties described in the SID frame. Occasional SID frame updates are transmitted to the decoder to maintain a correspondence between the background noise at the transmitting terminal and the comfort noise generated in the receiving terminal. For example, in a GSM system, a new SID frame is sent once every 24 frames of normal transmission. Providing occasional SID frame updates in this way not only enables the generation of acceptably accurate comfort noise, but also significantly reduces the amount of information that must be transmitted over the radio link. This reduces the bandwidth required for transmission and aids efficient use of radio resources.

In the receiving (speech decoding) branch 14 of the mobile terminal, an RF signal is received by the transmitting/receiving unit 26 and down-converted from RF to base-band signal. The base-band signal is channel decoded by a channel decoder 32. If the channel decoder detects speech in the channel decoded signal, the signal is speech decoded by a speech decoder 34.

The mobile terminal also comprises a bad frame handling unit 38 to handle bad (i.e. corrupted) frames. A bad traffic frame is flagged by the Radio Sub-System (RSS) by setting a Bad Frame Indication (BFI) to 1. If errors occur in the transmission channel, normal decoding of lost or erroneous speech frames would give rise to a listener hearing unpleasant noises. To deal with this problem, the subjective quality of lost speech frames is typically improved by substituting bad frames with either a repetition or an extrapolation of a previous good speech frame or frames. This substitution provides continuity of the speech signal and is accompanied by a gradual attenuation of the output level, resulting in silencing of the output within a rather short period. A good traffic frame is flagged by the radio subsystem with a BFI of 0.

An embodiment of a prior art bad frame handling unit 38 is located in the Receive (RX) Discontinuous Transmission (DTX) handler. The bad frame handling unit carries out frame substitution and muting when the radio sub-system indicates that one or more speech or Silence Descriptor (SID) frames have been lost. For example, if SID frames are lost, the bad frame handling unit notifies the speech decoder of this fact and the speech decoder typically replaces a bad SID frame with the last valid one. This frame is repeated and gradually attenuated just as in the case of a repeated speech frame, in order to provide continuity to the noise component of the signal. Alternatively, an extrapolation of a previous frame is used rather than a direct repetition.

The purpose of frame substitution is to conceal the effect of lost frames. The purpose of attenuating the output when several frames are lost is to indicate the possible breakdown of the radio link (channel) to the user and to avoid generating possibly annoying sounds, which may result from the frame substitution procedure. However, substitution and attenuation of the usually uninformative background noise in the lost frames affects the perceived quality of the noisy speech or the pure background noise. Even at rather low levels of background noise, rapid attenuation of the background noise in lost frames leads to an impression of a badly decreased fluency of the transmitted signal. This impression becomes stronger if the background noise is louder.

The signal produced by the speech decoder, whether decoded speech, comfort noise or repeated and attenuated frames, is converted from digital to analogue form by a digital-to-analogue converter 40 and then played through a speaker or earpiece 42, for example to a listener.

SUMMARY OF THE INVENTION

According to an aspect of the invention there is provided a noise suppressor to suppress noise in a signal containing background noise the noise suppressor comprising an estimator to estimate a background noise spectrum in which an indication from at least one of a discontinuous transmission unit and a channel error detector is used to control estimation of the background noise spectrum.

Preferably the indication is provided by a speech decoder in an up-link path in the network.

Preferably the noise suppressor suppresses noise in a signal provided by the speech decoder.

Preferably the indication arises in a channel decoder and is handled by the speech decoder. Preferably the indication in handled by a bad frame handling unit in the speech decoder.

Preferably the noise suppressor provides its noise suppressed signal to a speech encoder.

Preferably the noise suppressor uses a flag or an indication which indicates that individual frames which are used to transmit the signal over the channel are erroneous.

Preferably up-dating of the estimated background noise spectrum is suspended during periods in which channel errors in the signal are detected by the channel error detector. In this way the parts of the signal containing channel errors or parts of the signal which are being generated to mask or ameliorate the channels errors are not used in the production of the estimate of the noise.

Preferably the noise suppressor comprises a voice activity detector to control estimation of the background noise spectrum. Preferably the estimated background noise spectrum is up-dated when the voice activity detector indicates that there is no speech. Preferably the state of the voice activity detector and/or its memory of previous no speech/speech decisions is/are frozen when the channel error detector detects channel errors.

Preferably a comfort noise is generated by a comfort noise generator during time periods in which the signal is not being transmitted. Preferably up-dating of the estimated background noise spectrum is suspended during periods in which the discontinuous transmission unit is indicating that the signal is not being transmitted. In this way the comfort noise is not used in the production of the estimate of the noise.

The term "comfort noise" means a noise generated to represent background noise without being the background noise actually occurring at the time when it is generated. For example, the comfort noise may be a noise estimated from analysing background noise before the comfort noise is generated, it may be a random or pseudo-random noise or it may be a combination of noise estimated from analysing background noise and random or pseudo-random noise.

In an embodiment of the invention in which the noise suppressor is provided in a mobile terminal, it may be located so that it provides noise suppressed speech to an encoder and receives noise suppressed speech from a decoder. Of course, the encoder and decoder may comprise a codec.

Preferably the noise suppressor is in a wireless path. It may be in a down-link wireless path from a communications network to a communications terminal.

According to another aspect of the invention there is provided a method of noise suppression to suppress noise in a signal containing background noise comprising the steps of:

estimating a background noise spectrum;

using the background noise spectrum to suppress noise in the signal;

receiving an indication to indicate the operation of at least one of a discontinuous transmission unit and a a channel error detector; and using the indication to control estimation of the background noise spectrum.

According to another aspect of the invention there is provided a mobile terminal comprising a noise suppressor to suppress noise in a signal containing background noise the noise suppressor comprising an estimator to estimate a background noise spectrum in which an indication from at least one of a discontinuous transmission unit and a channel error detector is used to control estimation of the background noise spectrum.

Preferably the mobile terminal comprises the channel error detector. The channel error detector may provide an indication that individual frames which are used to transmit the signal over a channel are erroneous.

Preferably the indication is provided by a speech decoder in a down-link path. Preferably the detector for detecting channel errors is in the speech decoder. Preferably the indication arises in a channel decoder and is handled by the speech decoder. Preferably the indication is handled by a bad frame handling unit in the speech decoder.

Preferably the noise suppressor of the mobile terminal comprises a voice activity detector to control estimation of the background noise spectrum. Preferably the voice activity detector is part of a speech encoder.

Preferably the mobile terminal comprises the discontinuous transmission unit.

According to another aspect of the invention there is provided a mobile terminal comprising a downlink path having a receiver to receive wireless signals and a means to output the signal in a form understandable by a user and a noise suppressor to suppress noise in received signals in which the noise suppressor is provided in the downlink path.

When applied to a communications path in a communications system, the term downlink refers to the path from the network to a mobile terminal. Of course, the signals may be transmitted to a fixed communications terminal, such as a landline telephone, rather than to a mobile terminal.

According to another aspect of the invention there is provided a mobile communications system comprising a mobile communications network and a plurality of mobile communications terminals in which the network has a noise suppressor to suppress noise in a signal containing background noise the noise suppressor comprising an estimator to estimate a background noise spectrum in which an indication from at least one of a discontinuous transmission unit and a channel error detector is used to control estimation of the background noise spectrum.

Preferably the signal is produced by a microphone. It may be produced by a telephone microphone.

Preferably the mobile communications system comprises the discontinuous transmission unit.

Preferably the noise suppressor is located at the output of a decoder in the network so as to suppress noise in decoded speech. Alternatively the noise suppressor provides noise suppressed speech to an encoder in the network.

According to another aspect of the invention there is provided a mobile communications system comprising a mobile communications network and a plurality of mobile communications terminals in which a noise suppressor is provided in the network to suppress noise in signals provided by at least one of the mobile terminals.

According to another aspect of the invention there is provided a frame replacer for replacing frames in a signal to limit the disturbance caused by channel errors in the signal the frame replacer comprising a memory to store a previously received part of the signal indicated as being free of errors a noise generator to generate a noise signal and a frame generator to progressively attenuate the previously received part of the signal and to combine the attenuated previously received part of the signal and the noise signal to produce a combined signal the frame generator providing to the combined signal an increasing contribution from the noise signal relative to the previously received part of the signal as time passes.

The noise signal may be a random or pseudo-random signal. It may be a combination of a random or pseudo-random signal and a noise estimate.

Preferably the previously received part of the signal is repeated and progressively attenuated on each repetition. It may be a frame which has been received. The noise signal may be a set of synthetic frames which have been generated. The synthetic frames of the noise signal may be added frame by frame to each progressively attenuated frame of the previously received part of the signal. Preferably the contribution of the noise signal is increased to the same extent as the previously received part of the signal is reduced so that the level of the combined signal is about the same as the previously received part of the signal.

At least one of the noise signal and previously received part of the signal is attenuated so as to indicate breakdown of the channel. Preferably both signals are attenuated. Attenuation of the noise signal may commence once the previously received part of the signal is attenuated to such an extent that it no longer contributes to the combined signal.

The frame replacer may be part of a bad frame handler which is a part of a speech decoder. The noise generator may be in a noise suppressor. The noise suppressor may obtain information from the speech decoder and may adjust the amplification it applies to the noise it has generated based on the information it receives and its own measurement of how much attenuation the repeated/interpolated frames have undergone since the latest time when the bad frame indication was off.

The replacer may replace frames containing errors, missing frames or both. The channel errors may have been caused by transmission of the signal over an air interface.

According to another aspect of the invention there is provided a method for replacing frames in a signal to limit the disturbance caused by channel errors the method comprising the steps of:

storing a previously received part of the signal indicated as being free of errors; progressively attenuating the previously received part of the signal;

generating a noise signal;

combining the attenuated previously received part of the signal and the noise signal to produce a combined signal;

providing to the combined signal an increasing contribution from the noise signal relative to the previously received part of the signal as time passes.

According to another aspect of the invention there is provided a mobile terminal comprising a frame replacer for replacing frames in a signal to limit the disturbance caused by the channel errors in the signal the frame replacer comprising a memory to store a previously received part of the signal indicated as being free of errors a noise generator to generate a noise signal and a frame generator to progressively attenuate the previously received part of the signal and to combine the attenuated previously received part of the signal and the noise signal to produce a combined signal the frame generator providing to the combined signal an increasing contribution from the noise signal relative to the previously received part of the signal as time passes.

According to another aspect of the invention there is provided a communications system comprising a communications network having a frame replacer for replacing frames in a signal to limit the disturbance caused by channel errors and a plurality of communications terminals the frame replacer comprising a memory to store a previously received part of the signal indicated as being free of errors a noise generator to generate a noise signal and a frame generator to progressively attenuate the previously received part of the signal and to combine the attenuated previously received part of the signal and the noise signal to produce a combined signal the frame generator providing to the combined signal an increasing contribution from the noise signal relative to the previously received part of the signal as time passes.

According to another aspect of the invention there is provided a detector for detecting discontinuities in a signal comprising a sequence of frames and containing background noise in which the amplitude of the signal is measured to detect a sudden fall in amplitude and when an amplitude fall is detected its sharpness is determined and if the sharpness is sufficiently sharp a discontinuity indication is provided to control estimation of background noise.

According to another aspect of the invention there is provided a noise suppressor comprising an estimator to estimate background noise in a signal comprising a sequence of frames and containing background noise and a detector for detecting discontinuities in the signal in which the amplitude of the signal is measured to detect a sudden fall in amplitude and when an amplitude fall is detected its sharpness is determined and if the sharpness is sufficiently sharp a discontinuity indication is provided to control estimation of the background noise.

The invention is to detect artificial gaps in the signal which may have deliberately produced and but are not readily detectable because there is no discontinuity in the sequence of frames.

Preferably the discontinuity indication is used to control the rate at which an estimate of the background noise is up-dated. Preferably the rate is reduced when an amplitude fall is detected.

Preferably reduction of the rate at which the background noise estimate is up-dated is to protect the background noise estimate from being up-dated by something which is not noise being produced contemporaneously but may be based on noise from an earlier time. Preferably the background noise estimate is generated in a noise suppressor. Although the detector may be part of the noise suppressor, it may be a separate unit which simply gives and takes input to and from the noise suppressor. The decrease in amplitude may be due to one or more lost frames, or to an attenuation and repetition process used to mask such lost frame or frames or may be due to a reduction in real noise which is occurring contemporaneously which is contained in the signal. Alternatively, the detector detects a discontinuity caused by muting of the microphone. Reducing the rate of up-dating of the noise estimate results in the noise estimate being influenced less by part of the signal which is being dealt with at that particular time. In this way the noise estimate is still based on real background noise if it is still contained within the signal but its influence is reduced to deal with the possibility that real background noise is no longer contained within the signal at that time but some other signal, for example a repeated and attenuated frame is being used instead.

According to another aspect of the invention there is provided a method of detecting discontinuities in a signal comprising a sequence of frames and containing background noise comprising:

measuring the amplitude of the signal to detect a sudden fall in amplitude;

detecting when the amplitude falls;

determining the sharpness of the fall; and if the sharpness is sufficiently sharp providing a discontinuity indication to control estimation of the background noise.

According to another aspect of the invention there is provided a mobile terminal comprising a noise suppressor in which the noise suppressor comprises an estimator to estimate background noise in a signal comprising a sequence of frames and a detector for detecting discontinuities in the signal the amplitude of the signal being measured to detect a sudden fall in amplitude and when an amplitude fall is detected its sharpness is determined and if the sharpness is sufficiently sharp a discontinuity indication is provided to control estimation of the background noise.

According to another aspect of the invention there is provided a communications system comprising a communications network having a noise suppressor and a plurality of communications terminals the communications system comprising an estimator to estimate background noise in a signal comprising a sequence of frames and a detector for detecting discontinuities in the signal in which the amplitude of the signal is measured to detect a sudden fall in amplitude and when an amplitude fall is detected its sharpness is determined and if the sharpness is sufficiently sharp a discontinuity indication is provided to control estimation of the background noise.

According to another aspect of the invention there is provided a noise suppression stage to act on a signal the noise suppression stage comprising a first windowing block to weight the signal by a first window function a transformer to transform the signal from the time domain into the frequency domain a transformer to transform the signal from the frequency domain into the time domain and a second windowing block to weight the signal by a second window function.

According to another aspect of the invention there is provided a two phase windowing method comprising the steps of:

weighting a signal in the time domain by a first window function to produce a frame;

transforming the frame into the frequency domain;

transforming the frame back into the time domain; and weighting the frame by a second window function to suppress errors in matching between adjacent frames.

Preferably the method comprises the step of weighting by the windows after a speech encoding step. Alternatively, weighting may occur before a speech encoding step.

Preferably the window functions have a trapezoidal shape having a leading slope and a trailing slope. Preferably the first window function has a leading slope having a gradient which is shallower than that of the leading slope of the second window function. Preferably the first window function has a trailing slope having a gradient which is shallower than that of the trailing slope of the second window function. Having a relatively shallow slope in the first window function enables provides a good frequency transform. Having a relatively steep slope in the second window function provides good suppression of mismatch between adjacent frames in the time domain.

According to another aspect of the invention there is provided a mobile terminal comprising a noise suppression stage to act on a signal the noise suppression stage comprising a first windowing block to weight the signal by a first window function a transformer to transform the signal from the time domain into the frequency domain a transformer to transform the signal from the frequency domain into the time domain and a second windowing block to weight the signal by a second window function.

According to another aspect of the invention there is provided a communications system comprising a communications network having a noise suppression stage to act on a signal and a plurality of communications terminals the noise suppression stage comprising a first windowing block to weight the signal by a first window function a transformer to transform the signal from the time domain into the frequency domain a noise suppressor to suppress noise in the signal a transformer to transform the signal from the frequency domain into the time domain and a second windowing block to weight the signal by a second window function.

The signal may be noisy speech although speech may not be present all of the time.

BRIEF DESCRIPTION OF THE DRAWINGS

An embodiment of the invention will now be described by way of example only, with reference to the enclosed drawings in which.

DETAILED DESCRIPTION

Figure 1:
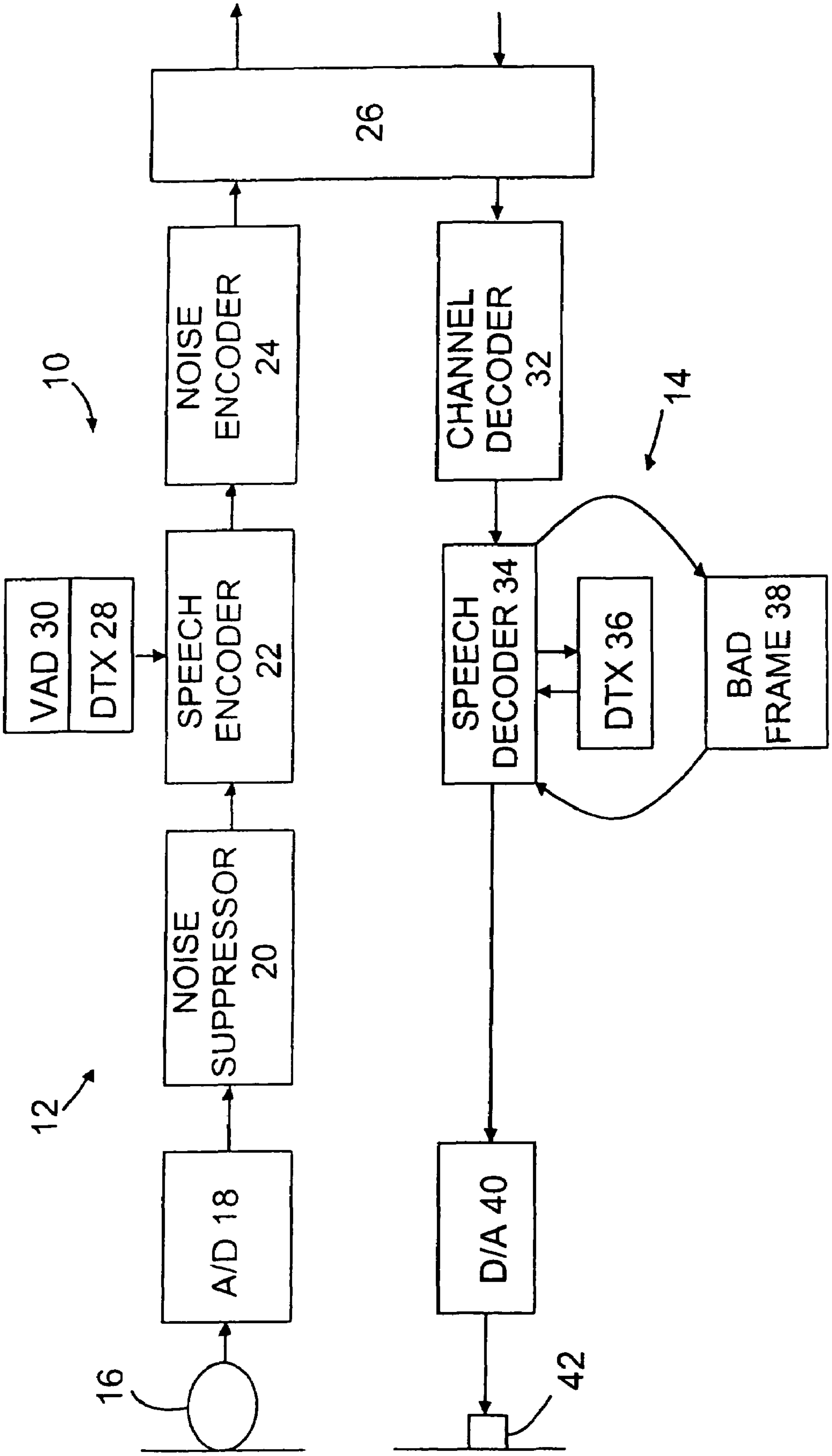
FIG. 1 shows a mobile terminal according to the prior art.

FIG. 1 has been described above in connection with conventional noise suppression techniques known from the prior art.

Figure 2:
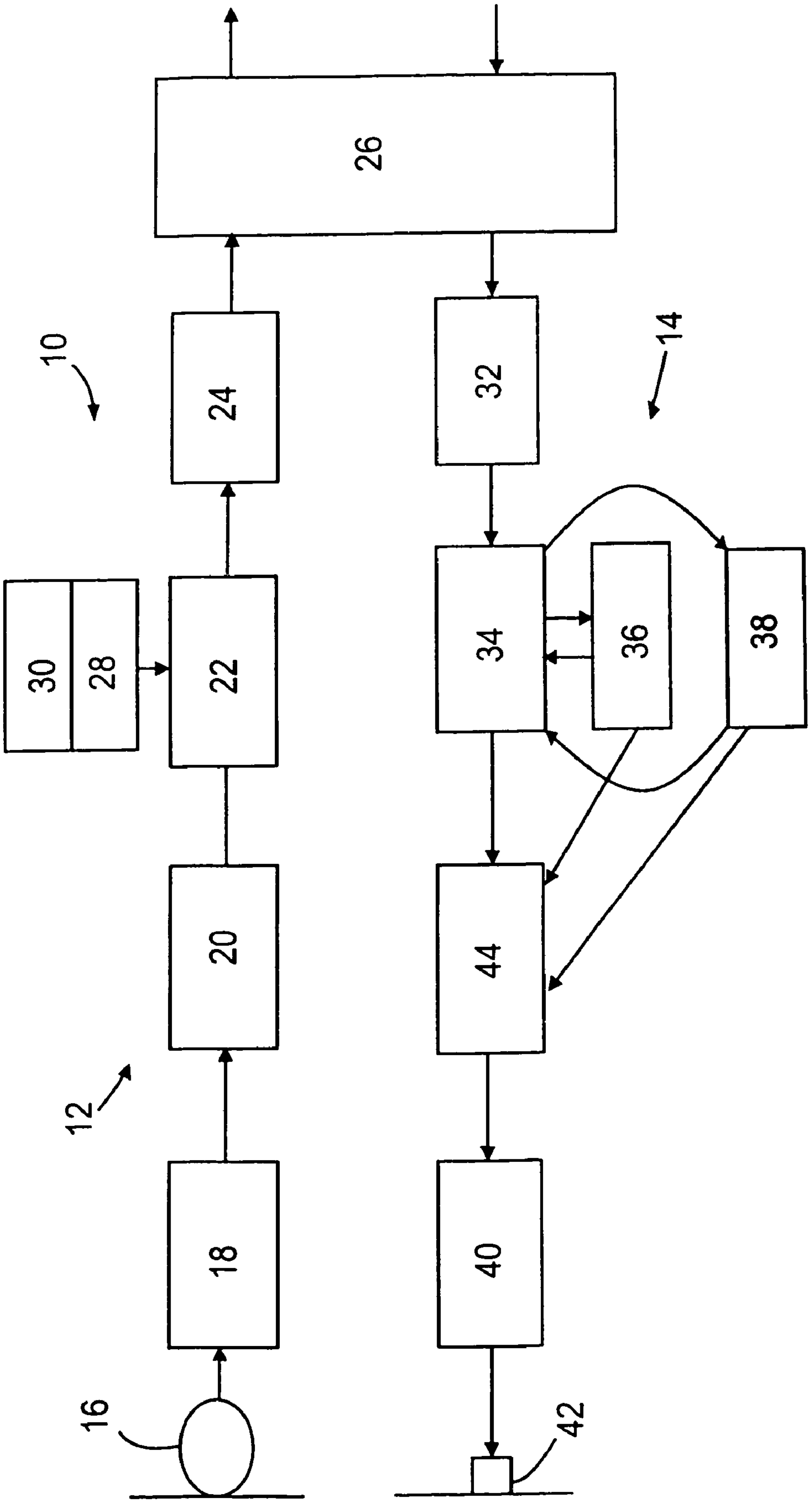
FIG. 2 shows a mobile terminal according to the invention.

FIG. 2 shows a mobile terminal 10 similar to that of FIG. 1, modified according to the present invention. Corresponding reference numerals have been applied to corresponding parts. The terminal 10 of FIG. 2 additionally comprises a noise suppressor 44 located in the receiving (down-link/speech decoding) branch 14. It should be noted that the noise suppressor 44 is connected to the DTX handler 36 and the bad frame handling unit 38. The noise suppressor 44 receives signals from the DTX handler 36 and the bad frame handling unit 38 which influence its operation, as will be described below. It should be noted that while the noise suppressor units in the speech encoding and speech decoding branches are shown as separate blocks (20 and 44) in FIG. 2, they may be implemented in a single unit. Such a single unit may have both speech encoding and speech decoding noise suppression functionality.

The noise suppressor 44 is located in the receiving (speech decoding) branch 14 at the output of a speech decoder (in this case the speech decoder 34). Therefore it must process a noisy speech signal resulting from one or more speech coding and decoding stages, for example in mobile-to-mobile connections across one or more mobile telephony systems.

It should be understood that although the voice suppressor 44 is shown in a mobile terminal, it may equally be located in a network. As will be explained below, its operation is particularly relevant to it being used in conjunction with a speech encoder, a speech decoder or a codec.

Figure 3:
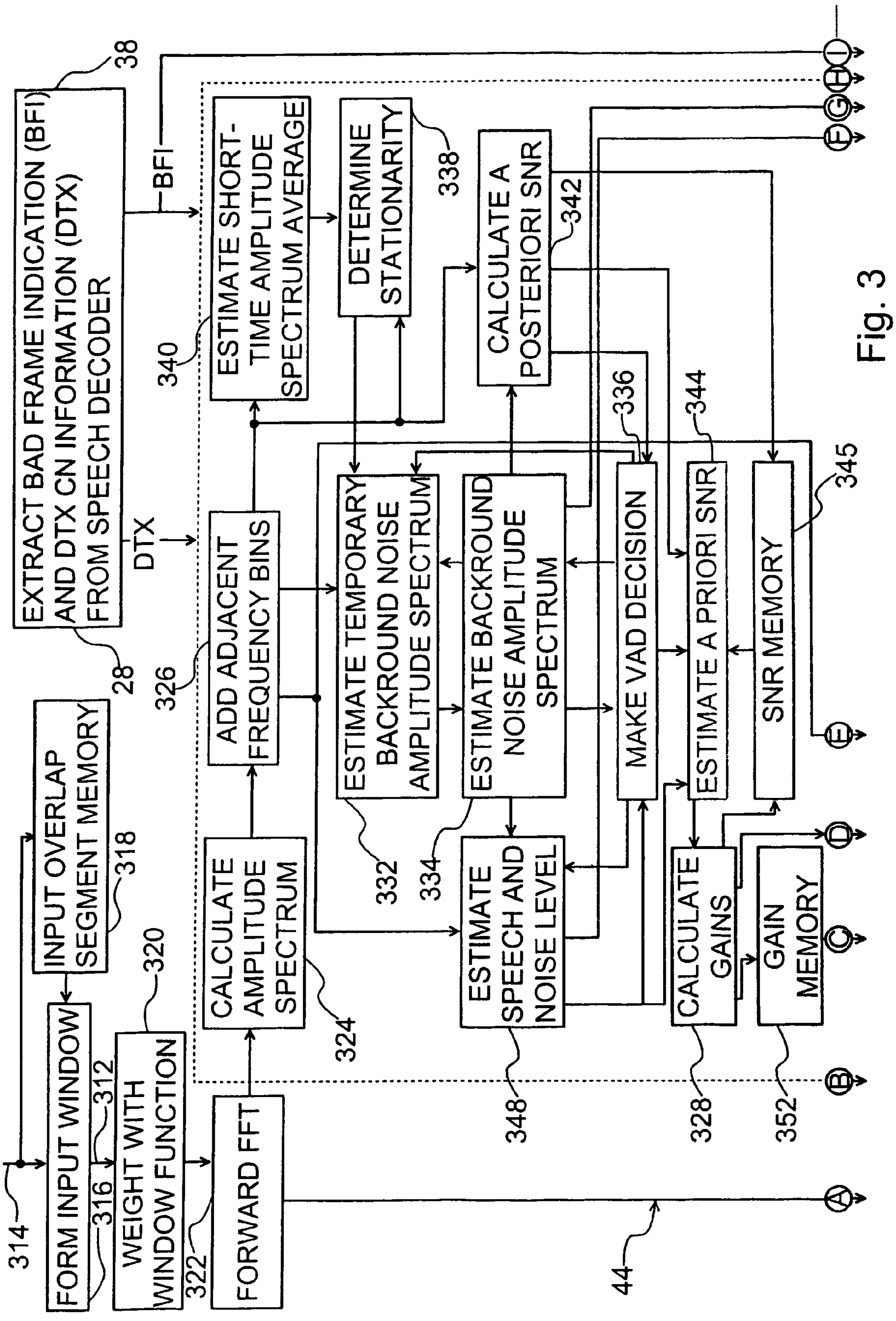
FIG. 3 shows detail of a noise suppressor in the mobile terminal of FIG. 2.

FIG. 3 shows details of a noise suppressor 300. The noise suppressor 300 can be applied to suppress noise in signals both received and transmitted by a mobile terminal and so can form the basis of noise suppressor 20 or noise suppressor 44 in the mobile terminal 10 of FIG. 2. The noise suppressor 300 is presented in terms of functional blocks. Functional blocks are also included for carrying out frame processing and Fast Fourier Transform (FFT) operations.

In the up-link (speech encoding) branch, the A/D converter 18 produces a stream of digital data which is provided to the noise suppressor 20 which converts it into an input frame. Creation of this input frame will now be described with reference to FIG. 3. An input sequence 312 of 80-sample frames is extracted from an input stream 314 in an input sequence forming block 316. The input sequence 312 is appended to an 18-sample sequence stored in an input overlap segment buffer 318. This 18-sample sequence was stored in the buffer 318 during creation of a previous input sequence. Once the contents of buffer 318 have been used for the new input frame, they are replaced by the last 18 samples of the new input sequence, which will be used in the creation of the next frame. The output of the input sequence forming block 316 is thus a sequence containing a total of 98 samples.

Figure 4:
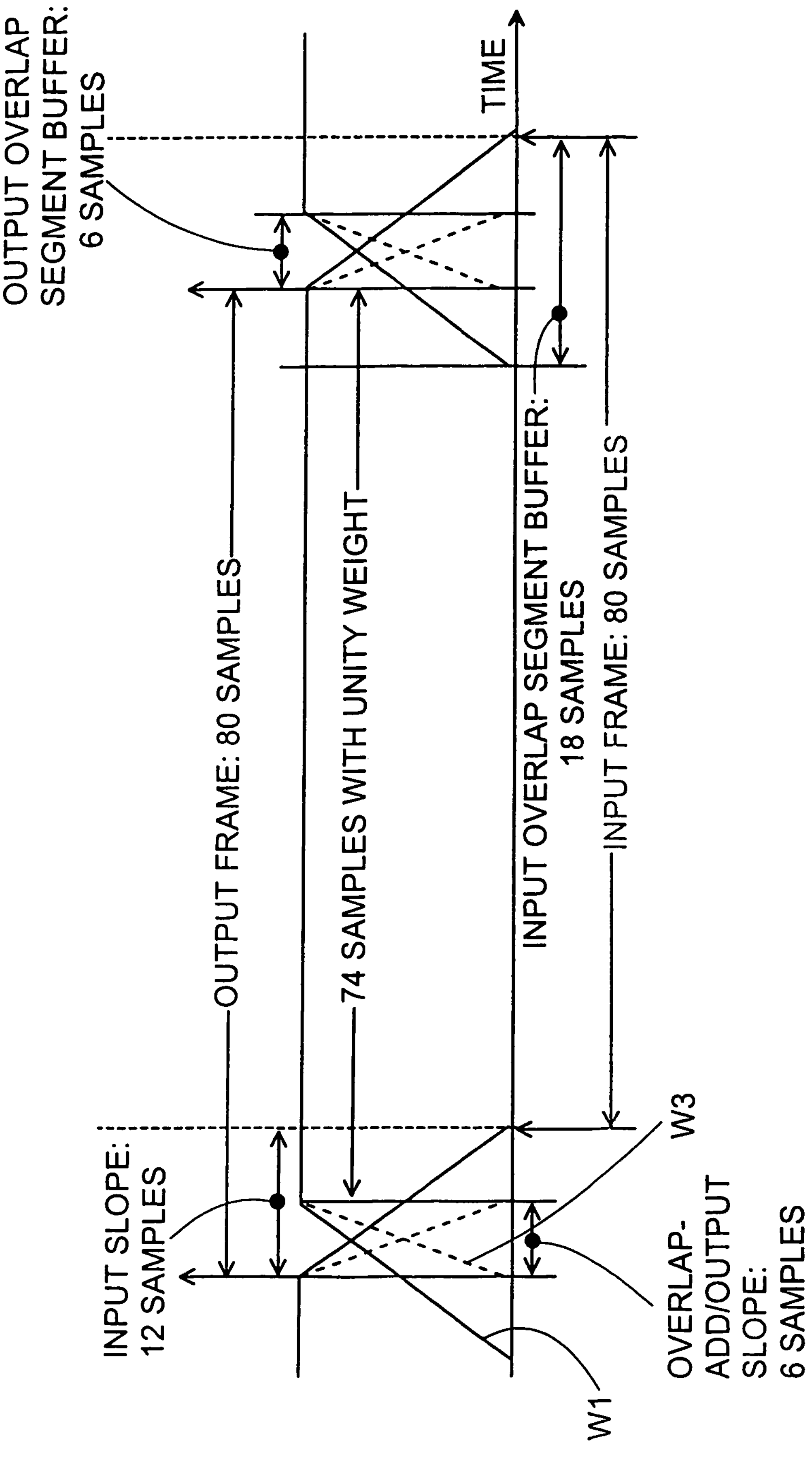
FIG. 4 shows representations of window functions according to the invention.

In block 320, a 98-sample trapezoidal window function is applied to the input sequence 312 obtained from the input sequence forming block 316. The window function is illustrated in FIG. 4 and is denoted by the label W1. FIG. 4 also shows another window function W3 which is described below. The window function W1 has leading and trailing ramps 12 samples in length. After windowing, the resulting input sequence is appended with 30 zeros, to produce a 128-sample input frame. It should be noted that the zero padding operation, just described, yields an input frame with a number of samples that is a power of 2, in this case $2^7$. This ensures that subsequent Fast Fourier Transform (FFT) and Inverse Fast Fourier Transform (IFFT) operations can be performed efficiently.

In block 322 a 128-point FFT is performed on the input frame to extract the frequency spectrum of the frame. The amplitude spectrum is calculated from the complex FFT using a predetermined frequency division that is coarser than the frequency resolution offered by the FFT length. The frequency bands determined by this division are referred to as "calculation frequency bands". The amplitude spectrum estimate contains information about the frequency distribution of the signal, which is then used in the noise suppressor 44 to calculate noise suppression gain coefficients for the calculation frequency bands (block 328). In part, the purpose of this computation is to establish and maintain an estimate of the frequency spectrum of the background noise.

In block 330, the complex FFT, provided as an output from block 322, is multiplied within the calculation frequency bands by the corresponding gain coefficients from block 328. Finally, the modified complex spectrum is transformed back into the time domain from block 328 using an inverse FFT in block 366.

It is known that the computational load and memory requirements, as well as the algorithmic delay of windowing operations may be reduced by using a simple trapezoidal window function with a short overlap segment. However, use of such a simple window function may give rise to undesirable effects in the output signal. The most prominent of these is a crackling sound introduced due to a mis-match (for example in signal level and spectral content) at the short, overlapping frame boundaries. This artefact may occur in conditions of moderate input SNR, where the gain function often manifests highly varying attenuation gains between the calculation frequency bands. When the noise suppressor acts as a pre-processing stage before a speech encoder, for example in the up-link (speech encoding) branch, this crackling is typically masked by the speech coding-decoding process itself.

However, in the case of the mobile terminal 10 of FIG. 2, there is no further speech encoding stage located downstream of the noise suppressor 44. Thus, undesirable artefacts introduced by the use of trapezoidal window functions with short overlapping segments are not concealed by a subsequent encoding process and will be audible in the output signal provided to the loudspeaker/earpiece 42. In order to overcome this problem, the overlap segment length could be lengthened and the window function smoothed, but this would lead to an increase in computational complexity and, particularly, in algorithmic delay.

Therefore, according to the invention, an output time domain frame is formed through an improved overlap-add procedure in order to suppress artefacts in frame boundary regions. This is represented by the window functions W1 and W2. A "two-phase" windowing arrangement is applied in which a combination of at least two trapezoidal window functions having slightly different characteristics are used, one window function for windowing frames being input into an FFT and another window function for windowing frames being output from an IFFT. In the method according to the invention, a first trapezoidal window function W1, having relatively long and shallow ramps is applied to the input signal in block 320 prior to the FFT being carried out in block 322. When the input signal is transformed back into the time domain by the IFFT in block 366, the output of the IFFT is modified in block 368 by a second trapezoidal window function W2, having shorter and steeper ramps than the window function used prior to the FFT. The length of the overlap-add segment is determined by the ramp length of the second tapered window. The window functions W1 and W3 can be seen, and compared, in FIG. 4.

W2 is only 86 samples long, having leading and trailing ramp functions of length six samples. The beginning of this second window is synchronised with the sixth sample of the IFFT output sequence (vector) and the ramp functions are such that they produce a linear ramp of length six samples at both ends of the window. The output of this operation is an 86 sample vector, the first six samples of which are summed sample-by-sample in block 372 with samples from an output overlap segment buffer 370 of the same size, stored during processing of the previous frame. The last six samples of the window output vector are then stored in the output overlap segment buffer 370 for use in the next frame. In block 374, the output frame is finally extracted as the first 80 samples of the window output, including the above summing of the first six samples with the previous output overlap segment buffer.

It should also be noted that the two-phase trapezoidal windowing process described above may be used in conjunction with a noise suppressor used as a post-processing stage after speech decoding, or it may be applied in a noise suppressor used as pre-processor prior to speech encoding. Specifically, the improved quality offered by the two-phase window at the input of a speech encoder may improve the quality achieved in the speech encoding process.

Since the input vectors for the FFTs in practice comprise real numbers, computational load can be reduced by packing two input frames into one complex FFT, using a trigonometric recombination method such as that described in Numerical Recipes in C; The Art of Scientific Computing (pp 414–415), 1988. In this approach, the samples of a first windowed and zero-padded frame are assigned to the real components of the input sequence for the FFT. A second frame is assigned to the imaginary components of the input sequence. A 128-point complex FFT is then computed. The complex spectra of the two frames can be separated by trigonometric recombination. After noise reduction processing of the two complex spectra, they are combined by adding to the first spectrum the second multiplied by the imaginary unit. The resulting complex spectrum is fed into an IFFT and the output time domain frames can be found in the real and imaginary parts of the IFFT output.

An approximate amplitude spectrum is calculated in block 326 from the complex FFT. In each FFT bin, the complex value is squared to produce an energy value for that bin. The squared FFT bin values within each of the calculation frequency bands are summed and then a square root is taken to yield an approximate average amplitude for each calculation frequency band. It should be appreciated that power spectral values can be used in an entirely analogous manner.

The background noise spectrum estimate is based on the approximate amplitude spectrum representation obtained as an output of block 326. Procedures for updating the background noise spectrum estimate are discussed below.

In the preferred embodiment of the invention, the frequency range from 0 Hz to 4 kHz is divided into 12 calculation frequency bands having unequal widths. The division is based on statistical knowledge about the average positions of formant frequencies in speech. The process of averaging spectral values over the calculation frequency bands effectively reduces the number of spectral bins to be processed and thus reduces the computational load of the algorithm and leads to savings in both static and dynamic random access memory (RAM). Moreover, averaging in the frequency domain has a smoothing effect on the enhanced speech. However, these benefits are obtained at the expense of frequency resolution and therefore a compromise may be necessary. In particular, if the background noise occupies the same frequency region as the speech signal, the frequency resolution should be high enough to allow for sufficient separation between speech and noise.

Operation of the noise suppression process which occurs in the noise suppressor 44 will now be described. Noise suppression is concerned with enhancing a speech signal which has been degraded by additional background noise. According to the present invention, noise suppression is performed by computing an estimate of the spectrum of the noisy speech signal, estimating the spectrum of the background noise, and trying to produce an enhancement of the noisy speech spectrum with a lower noise level than the original noisy speech.

In the noise suppressor 44, modified Wiener filtering is used. Gain coefficients for each calculation frequency band are calculated in block 328, based on an a priori SNR estimate computed in block 344 using the amplitude spectrum estimates for the incoming (current) speech frame and the background noise. An interpolation based on these gain coefficients is then performed in block 351 to provide each FFT bin with a gain coefficient according to the calculation frequency band within which it resides. Gain coefficients for the FFT bins below the lower frequency of the lowest calculation frequency band are determined on the basis of the gain coefficient of the lowest calculation frequency band. Similarly, the gain coefficients applied to FFT bins above the higher bound of the highest calculation frequency band are determined using the gain coefficient for the highest calculation frequency band. The complex spectral components are multiplied by the corresponding gain coefficients in block 330. In the noise suppressor 44, gain coefficient values are in the range [low_gain,1], where 0<low_gain<1, as this simplifies processing control with regard to overflows.

The gain computation formula for Wiener amplitude estimation for any frequency bin $\theta$ can be written as:

$$G_w(\theta) = \frac{\xi(\theta)}{1+\xi(\theta)}, \quad \theta = 0, 1, \ldots, 64 \qquad 1$$

where $\xi(\theta)$ is the a priori SNR. According to the prior art, the a priori SNR may be estimated according to a decision-directed estimation method, such as that presented in IEEE Transactions on Acoustics, Speech and Signal Processing, ASSP-32(6), 1984. Equation 1 is modified using stepwise frequency domain averaging of the amplitude spectra in the calculation frequency bands, which causes smaller bin-by-bin differences within a band than the original Wiener estimator using the full FFT-based frequency resolution. For notational clarity, the symbol s is used in the following to refer to a calculation frequency band and to distinguish it from $\theta$, the symbol used to denote an FFT bin. Furthermore, in order to calculate a gain coefficient within a calculation frequency band, a modification of the basic Wiener amplitude estimator is used. This can be represented as:

$$G(s) = \frac{\xi(s)}{1+\tilde{\xi}(s)}, \quad s = 0, 1, \ldots, 11 \qquad 2$$

The modification in Wiener filtering introduced here involves the way in which the a priori SNR for each calculation frequency band is estimated. Essentially, there is no way to extract a true a priori SNR from a single-channel signal since the original speech and noise signals themselves are not known a priori.

The estimation of the a priori SNR takes place in block 344. According to the prior art, the a priori SNR can be estimated using the decision-directed approach mentioned above, which can be expressed mathematically as follows:

$$\hat{\xi}(s, n)=\alpha G^2(s, n-1)\gamma(s, n-1)+(1-\alpha)\, P[\gamma(s, n)-1] \qquad 3$$

In equation 3, $\gamma(s,n)$ is the a posteriori SNR of frame number n, calculated in block 342 as the ratio of the components of the power spectrum of the current frame and the background noise power spectrum estimate for calculation frequency band s. This power ratio is calculated by squaring the ratio of the corresponding components of the respective amplitude spectrum estimates. $G(s,n-1)$ is the gain coefficient for calculation frequency band s determined for the previous frame, $P(\cdot)$ is the rectifying function and $\alpha$ is a so-called "forgetting factor" ($0<\alpha<1$). According to the decision-directed approach, $\alpha$ can take one of two values depending on the VAD decision for the present frame.

The a priori SNR can be estimated accurately in high SNR conditions and, more generally, in frequency bands where speech is either clearly present or is totally absent. However, since the Wiener estimation formula, presented in equation 1, has a derivative which increases strongly towards low values of SNR and the estimate given by equation 3 is not entirely accurate at low SNR values, direct application of the Wiener estimation formula as presented in Equation 1 causes annoying effects in low SNR frequency bands when some speech is present. In addition to speech distortion, the residual noise may become disturbingly unsteady during speech utterances at moderate noise levels.

In the present invention, an a priori ratio of noisy speech to noise is estimated instead of the conventional speech-to-noise ratio introduced above. In the following description, this noisy speech to noise ratio will be denoted using the abbreviation NSNR. By using an estimate of a priori NSNR, rather than a straightforward estimate of the a priori SNR, the subjective (perceived) quality of a noise suppressed speech signal may be significantly improved.

Thus, according to the invention, estimation of the a priori SNR is replaced with estimation of a noisy-speech-to-noise ratio, NSNR, leading to the following formulation replacing that of equation 3:

$$\hat{\xi}(s, n)=\alpha G^2(s, n-1)\gamma(s, n-1)+(1-\alpha)P[\gamma(s, n)] \qquad 4$$

It is claimed that NSNR can be estimated more accurately than the a priori speech-to-noise ratio SNR. According to equation 4, the a posteriori SNR values obtained for the previous frame, multiplied by the respective gain coefficients for the previous frame, are used in the calculation of the a priori noisy-speech-to-noise ratio for the current frame. The a posteriori SNR values for the each frame are stored in the SNR memory block 345 after calculation of the gain coefficients for the frame. Thus, the a posteriori SNR values for the previous frame may be retrieved from the SNR memory block 345 and used in the calculation of a priori NSNR of the current frame.

According to the invention, the NSNR estimate provided by equation 4 is also bounded from below, as expressed in equation 5. This effectively places an upper limit on the maximum noise attenuation that can be obtained:

$$\hat{\xi}'(s)=\max(\xi\_min, \hat{\xi}(s)) \qquad 5$$

By selecting a threshold value, $\xi_{13}$ min, that results in a maximum attenuation of approximately 10 dB and substituting $\hat{\xi}'(s)$ in the Wiener gain formula, the residual background noise (that is the noise component which remains after noise suppression) becomes smooth and speech distortion is significantly reduced.

The forgetting factor $\alpha$ in equation 4 is also treated differently than in the prior art noise suppression methods. Instead of selecting the forgetting factor $\alpha$ on the basis of the VAD decision, it is determined on the basis of the prevailing SNR conditions. This feature is motivated by the fact that in low SNR conditions, time domain smoothing of the a priori NSNR estimation can reduce the adverse effect of estimation errors on the quality of the noise-suppressed speech. To establish the relationship between the forgetting factor and the prevailing SNR conditions, $\alpha$ is calculated on the basis of an inversed a posteriori SNR indication, snr_ap_1$_n$, presented below in equation 6 below:

$$\alpha=\alpha(snr\_ap\_i_n) \qquad 6$$

An SNR correction is also introduced to the a priori NSNR estimate. This correction reduces a tendency to underestimate the a priori NSNR of equation 4 in low SNR conditions, an effect which causes muffling and distortion of the noise-suppressed (enhanced) speech. To perform the SNR correction, the long term SNR conditions are monitored at the input of the noise suppressor. For this purpose, long term noisy speech level and noise level estimates are established and maintained in block 348 by filtering the total input frame powers and the total power of the background noise spectrum estimate in the time domain.

To obtain a speech level estimate, the power spectrum of the current speech frame is averaged over the calculation frequency bands. The frame powers are filtered with a variable forgetting factor and a variable frame delay to produce the noisy speech level estimate. The noise level estimate is obtained by averaging the background noise spectrum estimate over the calculation frequency bands and filtering over time with a fixed forgetting factor.

The noise suppressor 44 also comprises a Voice Activity Detector (VAD) 336, which is used to control the up-dating procedure of the background noise spectrum estimate, as will now be described. Voice activity detection is used in the noise suppressor 44 mainly to control estimation of the background noise spectrum. The VAD 336 decision for each frame is, however, also used to control several other functions such as estimation of the noisy speech and noise levels related to the a priori NSNR estimation (described above) and the minimum search procedure in gain computation (described below). Furthermore, the VAD algorithm can be used to produce a speech detection indication for external purposes. Operation of the VAD indication can be optimised for external functions, such as hands-free echo control or discontinuous transmission (DTX) functions by making small modifications, such as parameter value changes to increase or decrease the sensitivity of the VAD.

In order to up-date the noisy speech level estimate only in frames containing speech, up-dating is permitted or prevented depending on whether voice activity is detected by the VAD 336 in the current frame and in nearby frames. A delay is introduced to enable monitoring of the VAD 336 decisions both before and after the frame from which the up-dating power is obtained. By taking this precaution, the impact on the speech level estimate of small powers in frames representing transitions between noisy speech and pure noise can be diminished and the inherent unreliability of the VAD 336 decisions in these frames can be compensated for. In practice, the delay is set to 2 frames except for frames with a very high frame power, in which case the minimum is selected within those of the latest three frames for which the VAD 336 detects speech.

To favour up-dating with frame powers which represent the mean range of the noisy speech power, the forgetting factor assumes values allowing fastest updating in cases where the difference between the current frame power and the old speech level estimate is small in absolute terms.

The noise level estimate is obtained by filtering the total power in the background noise spectrum estimate on a frame-by-frame basis. In this case, no additional VAD-based conditions are set and the forgetting factor is kept constant since the up-dating procedure for the noise spectrum estimate is already highly reliable.

Finally, a relative noise level indicator is defined which is used as an SNR correction factor. It is defined as a scaled and bounded ratio of the noise level estimate to the noisy speech level estimate, as shown in equation 7 below:

$$\eta = \min\left(\max\_\eta,\ \kappa\frac{\hat{N}}{\hat{S}}\right) \qquad 7$$

where $\hat{N}$ is the noise level estimate and $\hat{S}$ is the noisy speech level estimate; κ is a scaling factor, and $\max_{13}\eta$ is the upper bound of the result. $\hat{N}$ and $\hat{S}$ are calculated in block 348. The bounding can be implemented simply as saturation in fixed point arithmetic, and the scaling can be replaced by a left shift by setting κ=2. Since, according to a preferred embodiment of the invention, the noisy speech and noise level estimates are stored in the amplitude domain, the ratio in equation 7 is first calculated for the amplitudes and then squared to produce a power domain ratio.

The noise level estimate $\hat{N}$, described above, is set to zero at startup. The noisy speech level estimate $\hat{S}$, is initialised to a value corresponding to moderately low speech power. Another, somewhat smaller value is used as a minimum for the noisy speech level estimate in subsequent processing.

The SNR correction is applied to the a priori NSNR estimate according to equation 8:

$$\hat{\xi}(s)=(1+\eta)\hat{\xi}'(s) \qquad 8$$

This produces a modified a priori NSNR estimate for substitution into equation 2.

The detection of voice activity in a given speech frame is based on the a posteriori SNR estimate calculated in block 342 of the noise suppressor. Basically, the VAD decision is made by comparing a spectral distance measure $D_{SNR}$ to an adaptive threshold vth. The spectral distance $D_{SNR}$ is calculated as the average of the components of the a posteriori SNR vector:

$$D_{SNR} = \sum_{s=s\_l}^{s\_h} \upsilon_s \gamma(s), \qquad 9$$

where s_l and s_h are the indices of the components corresponding to the lowest and highest calculation frequency bands included in the VAD decision and $\upsilon_s$ is a weighting factor applied to the SNR vector component in band s. In the embodiment of the invention presented here, all components are considered with equal weight, that is, s_l=0, s_h=11, and $\upsilon_s$=1/12.

If $D_{SNR}$ exceeds the threshold vth, the frame is interpreted as containing speech and the VAD function indicates "1". Otherwise, the frame is classified as noise and the VAD indicates "0". These binary VAD decisions are stored in a shift register spanning 16 frames (one 16 bit static variable) to enable reference to past VAD decisions.

The VAD threshold value vth is normally constant. In very good SNR conditions, however, the threshold value is increased in order to prevent small fluctuations in signal power from being interpreted as speech. Small values of relative noise level η (described above) indicate good SNR conditions, since this factor is a scaled ratio of the estimated noise power to the estimated noisy speech power. Thus, when η is small, the VAD threshold vth is increased linearly with respect to the negative of η. A threshold relating to η is also defined such that when η is larger than the threshold, vth is kept constant.

If the input signal power is very low, small non-stationary events in the signal might be erroneously interpreted as speech, even after adaptation of the VAD threshold as described above. To suppress such false speech detections, the total power of the input signal frame is compared to a threshold. If the frame power remains below the threshold, the VAD decision is forced to "0", to indicate that there is no speech. This modification is, however, only carried out when the VAD decision is applied in the a priori NSNR estimation to determine the weights for the old estimate and the a posteriori SNR of the new frame in equation 4. For the purposes of up-dating the background noise spectrum estimate and the noisy speech and noise level estimates, as well as in a minimum gain search (which will be described below), the unaltered VAD decisions in the 16 bit shift register are used.

To ensure a good response to transients in speech, the noise attenuation gain coefficients calculated in block 328 using equation 2 should react quickly to speech activity. Unfortunately, increased sensitivity of the attenuation gain coefficients to speech transients also increases their sensitivity to non-stationary noise. Moreover, since estimation of the background noise amplitude spectrum is carried out by recursive filtering, the estimate cannot adapt quickly to rapidly varying noise components and thus cannot provide for their attenuation.

Undesirable variation in residual noise is also likely to be produced when the spectral resolution of the gain coefficient vector is increased, because at the same time averaging of the power spectrum components is reduced, that is there are fewer FFT bins per calculation frequency band. However, widening the calculation frequency bands reduces the ability of the algorithm to locate those frequencies at which noise may be concentrated. This may cause undesirable fluctuation in the noise suppressor output, especially at low frequencies where noise is typically concentrated. The high proportion of low frequency content in speech may, furthermore, cause reduction in noise attenuation in the same low frequency range in frames containing speech, tending to result in an annoying modulation of the residual noise synchronous with the rhythm of the speech.

According to the invention, the problems outlined above are addressed using a "minimum gain search". This is carried out in block 350. The attenuation gain coefficients G(s) determined for the current frame and one or two previous frames (which are stored in gain memory block 352) are examined and the minimum values of the attenuation gain coefficients for each calculation frequency band s are identified. The VAD decision relating to the current frame is taken into account when deciding how many previous attenuation gain coefficient vectors to examine, such that if no speech is detected in the current frame, two previous sets of attenuation gain coefficients are considered and if speech is detected in the current frame only one previous set is examined. The properties of the minimum gain search are summarised in equation 10 below:

$$G_A(s,n)=\min_{k=j}^{n}\{G(s,k)\},\quad j=\begin{cases} n-2 & \text{if } V_{ind}=0\\ n-1 & \text{if } V_{ind}=1\end{cases}, \qquad (10)$$

where $G_A(s,n)$ denotes the attenuation gain coefficient for calculation frequency band s in frame n after the minimum gain search and $V_{ind}$ represents the output of the voice activity detector.

The minimum gain search tends to smooth and stabilise the behaviour of the noise suppression algorithm. As a result, the residual background noise sounds smoother and quickly varying non-stationary background noise components are efficiently attenuated.

As already explained, when applying noise suppression in the frequency domain, it is necessary to obtain an estimate of the background noise spectrum. This estimation process will now be described in further detail. According to the invention, an estimate of the background noise spectrum is obtained by averaging frequency spectra of input signal frames during periods when there is no speech activity. This is carried out in block 332, which calculates a temporary background noise spectrum estimate and in block 334 which computes a final background noise spectrum estimate. According to this approach, up-dating of the background noise spectrum estimate is performed with reference to the output of the VAD 336.

If the VAD 336 indicates that no speech is present, the amplitude spectrum of the present frame is added, with a predefined weight, to the previous background noise spectrum estimate, multiplied by a forgetting factor. These operations are described by equation 11 below:

$$N_n(s)=\lambda N_{n-1}(s)+(1-\lambda)S(s)\quad s=0,\ldots,11 \qquad (11)$$

where $N_{n-1}(s)$ is the component of the background noise spectrum estimate in calculation frequency band s from the previous frame (frame n−1), S(s) is the sth calculation frequency band of the power spectrum of the present frame, $N_n(s)$ is the corresponding component of the background noise spectrum estimate in the present frame, and λ is the forgetting factor.

The forgetting factors are arranged so that they can deal more effectively with the use of amplitude spectra in up-dating noise statistics given by equation 11. Relatively fast time constants with smaller forgetting factors are used in the amplitude domain for upward up-dating, and slower time constants for downward up-dating. The time constants are also varied to accommodate large and small changes. Fast up-dating occurs in the upward direction when a spectral component must be up-dated with a value much larger than the previous estimate, and slow up-dating occurs in the downward direction when the new spectral component is far smaller than the old estimate. On the other hand, somewhat slower time constants are used to up-date spectral component values in the vicinity of an old estimate.

Because the VAD 336 only provides a two state output, identification of the beginning of an utterance involves a trade-off. At the beginning of a speech utterance the VAD 336 may continue to flag noise. Thus, the first frame of speech may be erroneously classified as noise and consequently the background noise spectrum estimate could be up-dated with a spectrum containing speech. A similar situation may arise at the end of an utterance.

As described in further detail below, this problem is tackled by screening a window of decisions from the VAD 336 before and after a frame prior to the frame being used to up-date the background noise spectrum estimate in block 334. Then the background spectrum can be up-dated with a delay (delayed up-dating) by a stored amplitude spectrum of a past frame.

According to the invention, up-dating of the background noise spectrum estimate is carried out in two stages. Firstly, a temporary power spectrum estimate is created in block 332 by up-dating the background noise spectrum estimate with the amplitude spectrum of the present frame. For this up-dating process to take place, one of the following three conditions should be fulfilled:

1. the VAD 336 decisions for the present and three past frames are "0" (indicating noise only);
2. the signal is judged as stationary for a required number of frames; or
3. the power spectrum of the present frame is lower than the background noise spectrum estimate for some frequency band.

Secondly, the resulting temporary power spectrum estimate (from block 332) is used as the actual background noise spectrum estimate for the following frame, unless the VAD decision for that frame is a "1" and three earlier (that is immediately preceding) frames produced a "0" VAD decision. In this case, corresponding, for example at the beginning of an utterance, the previous background noise spectrum estimate is copied from block 334 to the temporary power spectrum estimate in block 332 to reset the estimate.

Difficulties may also arise because the background noise spectrum estimation process is controlled by the VAD 336 decision, but the VAD 336 decision itself relies on the background noise spectrum estimate in block 334. If the background noise level suddenly increases, input frames may be interpreted as speech and no up-dating of the background noise spectrum estimate will be performed. This causes the background noise spectrum estimate to lose track of the actual noise.

To deal with this problem, a recovery method is used. Stationarity of the input signal is evaluated in block 338 during periods which the VAD 336 classifies as speech. A counter referred to as a "false speech detection counter" is maintained in block 339 to keep a record of successive "1" decisions from the VAD 336. Initially, the counter is set to 50, corresponding to 0.5 s (50 frames). If the input signal is considered sufficiently stationary and the current frame is interpreted as speech, the false speech detection counter is decremented. If stationarity is indicated and the VAD outputs a "0" for the current frame, but some of the past few frames produced a "1", the counter is not modified. If the input signal is judged to be non-stationary, the counter is reset to an initialisation value. Whenever the counter reaches zero, the background noise spectrum estimate in block 334 is updated. Finally, if 12 consecutive "0" VAD decisions are obtained, the false speech detection counter is also reset. This action is based on the assumption that such a succession of "0" VAD decisions indicates implicitly that the background noise spectrum estimate in block 334 has again reached the prevailing noise level.

To decide if the present frame represents a stationary signal, a short-term average of the input signal amplitude spectrum is maintained in block 340 by recursive averaging. The amplitude spectrum components of the present frame are divided by the corresponding components of the time averaged spectrum, and if any of the quotients becomes smaller than one, it is replaced by the reciprocal. If the sum of the resulting quotients exceeds a pre-defined threshold value, the signal is judged as non-stationary; otherwise stationarity is indicated. The components of the short-term average of the amplitude spectrum (maintained by recursive averaging in block 340) are initialised to zero since they change only slightly more slowly than the input frame amplitude spectrum.

In addition to the basic VAD-based up-dating approach and the recovery method described above, components of the background noise spectrum estimate in every frame are up-dated if the corresponding component of the amplitude spectrum of the present frame is smaller than the current background noise spectrum estimate. This enables rapid recovery from (1) high initialisation values of the background noise spectrum components (described below) and (2) erroneous forced up-dating that might occur during a real speech frame. This additional form of up-dating, referred to as "down-up-dating", is based on the fact that noise alone can never have a higher amplitude than noise plus speech. Down-up-dating is carried out by up-dating the temporary background noise spectrum estimate in block 332.

At startup, the background noise spectrum estimate components in block 334 are initialised to values that represent a high amplitude. In this way a wide range of possible initial input signals can be accommodated without encountering the problem of the background noise spectrum estimate losing track of the noise. The same initialisation is applied to the temporary background noise spectrum estimate in block 332 used for delayed up-dating.

Operation of the noise suppressor 44 is controlled so that it effectively suppresses noise in the down-link direction. In particular, its operation is controlled in order that the estimates of signal power and amplitude levels, particularly the background noise spectrum estimate in block 334, are not erroneously modified. Such erroneous modification could occur as a result of transmission channel errors. Channels errors can cause the corruption or loss of a number of frames, for example a few tens of frames or more. As mentioned earlier, if channel errors are detected they are concealed, typically by repeating (or extrapolating from) the latest good speech frame whilst applying a rapidly increasing attenuation.

During the time when no frames are received, no speech and no noise is received and so the temporary background noise spectrum estimate in block 332 and the background noise spectrum estimate in block 334 tend to decrease. Consequently, the noise suppressor 44 may lose track of the true noise spectrum.

If nothing were done to compensate for this effect, when the channel cleared and frames were received correctly again, noise suppression would take place based upon a reduced background noise spectrum estimate. Thus, the noise suppression provided by the noise suppressor would not be so effective and the noise level heard by a user of the mobile terminal would suddenly increase. Furthermore, after such an interruption, blocks 332 and 334 need to reconstruct their estimates of the background noise spectrum based on the true noise spectrum, to restore their accuracy. Until a reasonable estimate is obtained once more, the noise estimate will be incorrect and will be heard by the user as a sudden change in the type of noise. Such changes in the noise type and noise level are annoying to users.

Additionally, erroneous speech frames, which the speech decoder 34 fails to detect as erroneous, cause it to output false speech frames having high levels of randomly distributed energy. The noise suppressor 44 is unable to attenuate the signal in such frames.

Related problems are caused by the use of discontinuous transmission (DTX) or any similar kind of function, such as voice operated switching (VOX). As described earlier, during DTX a comfort noise spectrum is generated and comfort noise is played instead of true noise. If the comfort noise spectrum differs from the true noise spectrum, for example, if the true noise spectrum changes while the comfort noise is played, then the background noise spectrum estimate in block 334 will lose track of the true noise spectrum. Consequently, when DTX is discontinued and frames containing speech are received once more, the noise suppressor 44 will start to suppress the noise in the received signal using the previously valid background noise spectrum estimate. This will give rise to non-optimal attenuation.

To deal with problems caused by the effects of bad speech frames and DTX, they are also taken into account in up-dating the long-term estimate of the noisy speech level, as well as in the VAD 336 and the minimum gain search functions.

According to one embodiment the invention, a mobile phone is provided having noise suppressors located in both up-link and in down-link channels. In a telecommunications system in which two such mobile phones communicate, a signal may pass through a number of noise suppressors in a cascade arrangement. Furthermore, if noise suppressors are also used in the cellular network, such as in switches, transcoders or other network equipment, even more noise suppressors are present in the cascade. Such noise suppressors are generally optimised independently to provide maximum noise attenuation without causing disturbing distortion to speech. However, use of two or more such noise suppression operations in cascade could result in distortion of the speech speech.

In one embodiment of the invention the noise suppressor 44 is provided with a detector to analyse input to take into account the use of a noise suppressor earlier in the speech path. The detector monitors SNR conditions at the input of the noise suppressor 44 in the down-link (speech decoding) path and controls the attenuation gain computation according to the estimated SNR. In good SNR conditions, the amount of noise suppression is reduced or eliminated altogether, because these conditions might be the result of an earlier noise reduction stage. In any case, in good SNR conditions there is generally less need for noise suppression.

A control variable for the signal-dependent gain control is established by estimating the effective-full-band a posteriori SNR of the noise suppressor input signal as the ratio of long term estimates of the noisy speech power and the background noise power. The full-band a posteriori SNR is calculated in block 348. The term "effective-full-band" refers to the frequency range covered by the calculation frequency bands in the gain computation. For practical reasons, the inverse of the a posteriori SNR is estimated instead of the actual SNR. This approach is used mainly because it can always be assumed that the noise power is smaller than or equal to the noisy speech power. This simplifies calculations in fixed point arithmetic.

The a posteriori SNR, or snr_ap_i, is calculated as the ratio of the noise and noisy speech level estimates $\hat{N}$ and $\hat{S}$ as is discussed above. In this case, the ratio of the noise level to the noisy speech level is not scaled as in the case of the calculation of the SNR correction factor (equation 7) but is low-pass filtered over speech frames. The purpose of the filtering is to reduce effects of sudden changes in speech or background noise level in order to smooth attenuation control. The estimation of the control variable snr_ap_i is expressed as follows:

$$\text{snr\_ap\_i}_n = b\cdot\text{snr\_ap\_i}_{n-1} + (1-b)\cdot\min\left(\text{max\_snr\_ap\_i},\ \frac{\hat{N}}{\hat{S}}\right) \qquad 12$$

where n is the ordinal number of the current frame, b∈(0,1), $\hat{N}$ is the noise level estimate, $\hat{S}$ is the noisy speech level estimate, and max_snr_ap_i is the saturation value of snr_ap_i in fixed point arithmetic.

The control mechanism for restricting noise attenuation in good SNR conditions has been devised so that the attenuation in decibels (dB) is reduced linearly with an increase of SNR in decibels. This calculation method aims to provide a smooth transition, indiscernible to a listener. Moreover, the control is restricted to a limited range of input SNR.

The reduction in attenuation is realised through underestimation of the background noise spectrum term in the Wiener gain formula. Instead of equation 2 a modified form of the formula for gain computation is used:

$$G(s) = \frac{\tilde{\xi}(s)}{u(\text{snr\_ap\_i}) + \tilde{\xi}(s)} \qquad 13$$

The dependence of the unity term u(snr_ap_i) on the control variable snr_ap_i can be found by expressing the linear relationship in dB scales, at maximum attenuation. The following relationship can then be derived:

$$u(\text{snr\_ap\_i}) = \xi\text{\_min}\left(\frac{1}{10^{B/20}}\text{snr\_ap\_i}^{A/2} - 1\right) \qquad 14$$

where ξ_min is the lower bound of the band-wise a priori SNR obtained from block 344 and the constants A and B are determined by the lower and higher ends of the intended range of maximum nominal noise attenuation (discarding the effect of the SNR correction) and the lower and higher ends of the used range of control variable snr_ap_i.

In order to accommodate two competing gain control mechanisms, and to avoid non-optimal attenuation occurring in certain conditions, the control parameters of the gain control, and particularly the control variable and maximum attenuation ranges, are carefully selected so that the highest noise suppression is obtained in the range where greatest benefit is expected. This depends on estimating the SNR conditions sufficiently well.

Although problems might be expected in combining the gain functions, one in up-link and one in down-link, the first (up-link) noise suppressor generally improves the SNR conditions at the input of the second (down-link) noise suppressor. Therefore, this is taken into account in the tandeming consideration, so that a smooth and essentially monotonous combined gain function is obtained.

The noise suppressor 44 uses information concerning the occurrence of bad frames and the related actions taken by the speech decoder when it acts as a post-processing stage after speech decoding.

The bad frame indication flag derived from the channel decoder 32 is assigned to an appropriate entry in a control flag register in the noise suppressor where each flag reserves one bit position. When the channel decoder indicates that there is a bad frame, the bad frame flag is raised for example, it is set to 1. Otherwise, it is set to zero.

Immediately after a burst of lost speech frames is detected, certain functions normally controlled by the VAD 336 are made independent of the VAD 336 decisions. Additionally, the state of the VAD 336 and the shift register containing past VAD decisions are frozen while the bad frame indication flag indicates bad frames. This allows those functions which are dependent on the VAD 336 to use the last "good" VAD decisions after bursts of bad frames which are usually of short duration. In most cases, this minimises disturbances in noise suppressor performance caused by the bad frames.

To maintain the correct spectral level and shape of the background noise spectrum estimate, it is not up-dated while the bad frame indication flag is set. In particular, the temporary background noise spectrum estimate is not up-dated. However, up-dating of the background noise spectrum estimate is delayed by replacing it with the temporary background noise spectrum estimate even while bad frames are being flagged if the present VAD 336 decision is "1" and has been preceded by three "0" VAD decisions, as discussed above. Since the temporary background noise spectrum estimate is not up-dated, this ensures that only the last valid information concerning the actual noise spectrum is included in the estimate of the background noise spectrum.

To provide a proper reference for stationarity detection in block 338, the short-time average of the input signal power spectrum is not up-dated when bad frames are flagged. The false speech detection counter is also not up-dated while the bad frame indication flag is set in order to preserve its state over the succession of bad frames, which is typically short.

To obtain correct background noise reduction in repeated and attenuated frames, the attenuation provided by the bad frame handler on the decoded signal has to be taken into account. For this purpose, the background noise spectrum estimate (which is used to yield the a posteriori SNR by dividing the current frame power spectrum component by component) is multiplied by the repeated frame attenuation gain. The repeated frame attenuation gain is calculated in block 346.

Up-dating of the noisy speech level estimate $\hat{S}$ calculated in block 348 is disabled during bad frames. The delayed values of the frame powers of the two latest frames used in the estimation of the noisy speech level are also frozen when the bad frame indication flag is set. Hence, the up-dating procedure is provided with the powers of the frames corresponding to the latest up-dated VAD decisions.

In contrast, the noise level estimate $\hat{N}$ is up-dated continuously in block 348 during bad frames. This procedure is motivated by the fact that the noise level estimate $\hat{N}$ is based on the background noise spectrum estimate, which is protected by the above measures from the effects of repeated and attenuated frames. Thus, the time that elapses during bad frames can actually be exploited to obtain a low-pass filtered noise level estimate that is closer to the average power of the noise spectrum estimate.

The minimum gain search is disabled during bad frames. If it were not, the updating of the gain memory with reduced gain values would bias the transition, for example, from bad frames to good speech frames, causing the first few (for example one or two) good speech frames following a sequence of bad frames to be attenuated too heavily.

In bad channel error conditions, the channel decoder 32 may not be able to correctly recover a frame and so forwards a badly erroneous frame to the speech decoder. As channel errors typically occur in bursts, bad frames usually occur in groups. If the bad frame handling unit 38 of the speech decoder 34 fails to detect a bad frame and that frame is consequently decoded normally, the result is typically a highly energetic random sequence, which sounds very unpleasant. However, such an erroneous frame does not necessarily cause problems in the noise suppressor 44. Such a frame, typically having a high energy content, will not be included in the background noise estimate since the VAD 336 should flag speech.

Furthermore, the high frame energy will not influence the noisy speech level estimate $\hat{S}$ significantly, since the forgetting factor will be increased (corresponding to long time constant) according to the rules of the noisy speech level estimation, where a large difference between the current estimate and the new frame power will cause a large forgetting factor to be selected. Moreover, if there are not too many of these erroneous frames, the minimum of the latest three frame powers will probably be used to up-date the noisy speech level estimate $\hat{S}$, instead of the erroneous high power frame.

If the burst of undetected high power bad frames is long (for example if their duration is 0.5 s or longer), there is a danger that forced up-dating of the background noise spectrum estimate might be activated. Although this requires stationarity of the input, this condition might be fulfilled if the decoded erroneous frames resemble white noise. However, such a long error burst might already lead to dropping of the call, making this worst case of initiating forced up-dating rather improbable. Moreover, even if the background noise spectrum estimate were updated to a high level according to erroneous frames, the VAD 336 would interpret the input signal as noise for some time. This, together with the down-up-dating procedure discussed above, would enable the noise spectrum estimate to regain the lost noise spectrum shape and level quickly, typically within a few seconds.

According to the invention, measures are taken in the noise suppressor to deal with problems which can arise in a mobile-to-mobile connection where bad channel conditions may prevail in either of the two radio paths. The noise suppressor 44 receiving frames over such a bad mobile-to-mobile connection, that is the noise suppressor in the down-link (speech decoding) connection, is not able to obtain any information about the channel conditions in the up-link connection (that is from the transmitting mobile to the network). Therefore, it is unable to generate any explicit bad frame indication. The bad frame handling unit 38 in the speech decoder 34 of the up-link connection will, however, follow the standard procedure of repeating and attenuating the latest good frame, as will the bad frame handler of the down-link speech decoder 34. Consequently the noise suppressor 44 in the down-link connection receives bursts of highly attenuated frames with no accompanying bad frame information.

To deal with this problem, the down-link noise suppressor 44 slowly down-updates the temporary background noise spectrum estimate, the short-time average of the speech power spectrum and the noisy speech level estimate if unnatural gaps are detected in the input signal. A gap detection procedure comprising three comparison steps is used in the down-updating process applied to the temporary background noise spectrum estimate and the short-term average of the speech power spectrum. The three steps are:

1. Comparison of the input power in each calculation frequency band to a small threshold value.
2. Comparison of the up-dating input power to the level of the current estimate in each calculation frequency band.
3. Comparison of the stationarity measure to the stationarity threshold value calculated in block 338.

The first two comparison steps, introduced above, are performed for each calculation frequency band. The purpose of the third comparison step is to disable the recovery action in low noise conditions. If the noise is at a low level from the beginning of a call, the short-term average of the input amplitude spectrum never assumes high values and, consequently, the stationarity measure remains low. On the other hand, if the noise level drops after having been high, this procedure will restore the normal up-dating speed after a while, as the short-term average of the input amplitude spectrum reaches a lower level during slow up-dating.

In the case of the noisy speech level estimate, only the first two comparisons above are carried out and they are performed on the effective-full-band powers.

Even though missing frames are reliably detected by the noise suppressor 44, the noise spectrum estimate tends to become easily up-dated just sufficiently to cause the VAD 336 to incorrectly interpret noise as speech after muting of frames. To deal with this, the stationarity detection threshold is manipulated during a period when muted frames are detected to improve the chances of the noise suppressor 44 correctly detecting speech. The original threshold is restored as soon as the next occasion arises when the false speech detection counter initiates forced background spectrum up-dating. This action appears to play a decisive role, as it efficiently prevents the resetting of the false speech detection counter in transitions to and from muted frames, where the stationarity measure easily assumes high values.

This approach to the detection of and protection against undetected muted frames is able to identify frames in which the signal is almost or totally missing. Furthermore, these measures do not cause negative effects in situations in which no signal gaps are present.

As mentioned above, a DTX handler operates in conjunction with the speech decoder. Since the comfort noise signal produced at the receiver is, in practice, never identical to the original noise component at the transmitting (far end) terminal, the noise suppressor 44 at the receiving end is controlled so that it is not affected by a change in the nature of the background noise during periods in which DTX is active.

In the present GSM system, an explicit flag is provided in the speech decoder indicating whether the DTX operation mode is on. In GSM speech codecs, the decision to switch off transmission during speech pauses is made in the Transmit (TX) Discontinuous Transmission (DTX) handler of the speech codec. At the end of a speech burst, it takes a few consecutive frames to generate a new SID frame which is then used to carry comfort noise parameters describing the estimated background noise characteristics to the decoder. The radio transmission is cut after the transmission of the SID frame and the Speech flag (SP flag) is set to zero. Otherwise, SP flag is set to 1 to indicate radio transmission.

This speech flag is received by the speech decoder and is also used in the noise suppressor 44 to set the DTX flag in the noise suppressor control flag register to 0 or 1, respectively. The decision of invoking the operation mode intended for DTX periods is based on the value of this flag. In the DTX mode, the VAD 336 of the noise suppressor 44 is by-passed and the VAD decision is made according to the DTX handler of the speech codec. Thus, when the DTX function is on, the VAD decision is set to zero, with the consequences described below.

The ability of the GSM speech codec DTX functions to estimate the spectral level and shape of the background noise process varies. In addition, the spectral shape of comfort noise is usually flatter than the spectrum of the actual background noise. Therefore, the noise suppressor 44 is configured so that it only estimates the background noise spectrum in block 334 during frames in which DTX is not occurring. Consequently, the estimation of the temporary background noise spectrum in block 332 occurs only at times when DTX is off. However, copying of the actual background noise spectrum estimate is enabled in all frames to guarantee inclusion of the latest useful information in the final background noise spectrum estimate used in the delayed up-dating process described above.

Updating of the background noise spectrum estimation in block 334 does not occur while comfort noise is being transmitted and so stationarity detection is not carried out during such frames. However, after a number of comfort noise frames have been transmitted, a new speech frame is probably no longer correlated to a comfort noise frame. As a consequence, the false speech detection counter is reset. This resetting is performed after sixteen speech pause decisions of the VAD 336 (as explained above, the VAD 336 is set to detect speech pauses whilst comfort noise is transmitted).

In comfort noise frames, the noise attenuation gain is assigned the minimum allowable value in all calculation frequency bands. This minimum gain value is determined by replacing $\hat{\xi}'(s)$, by ξ_min in equation 8 and substituting the result into equation 2. Since this special gain formula is used, the computation of the a priori SNR in block 344 can be disabled during comfort noise generation. The “enhanced a posteriori SNR” vector of the previous frame (the a posteriori SNR multiplied by the squared attenuation gain), which is used in the computation of the a priori SNR, calculated for the most recent speech frame, is maintained until the next speech frame where it can be used.

In one embodiment of the invention the noise suppressor 44 is used to compensate for variations in the spectral characteristics of the comfort noise signal generated during DTX frames which originate from imperfections in background noise spectrum estimation in speech encoders. The noise suppressor can be used to obtain a relatively reliable estimate of the background noise spectrum at the far end (for example, at a transmitting mobile terminal). Therefore, this estimate can be used, within the noise suppressor 44, to modify the spectral level and shape of the generated comfort noise. This involves predicting the residual noise spectrum that would come out of the noise suppressor 44 if the input spectrum corresponds to the current background noise estimate and then modifying the amplitude spectrum of the input comfort noise signal so that it resembles this residual noise estimate. It is preferred to use a compromise between the constant attenuation in all calculation frequency bands, as discussed above, and the modification toward the estimated residual noise. This approach employs the knowledge that both the speech encoder and the noise suppressor 44 have acquired concerning the noise at the far end.

Because of the smooth nature of the comfort noise generated in a speech decoder, there is no need to use the minimum gain search function of block 350 to stabilize the behaviour of the noise reduction gain during comfort noise frames. Moreover, in this way, the related memory of the past gain vector values in block 352 is not up-dated. Thus, the gain vectors stored in the memory will represent the conditions where DTX is off and, hence, be better applicable to the condition where the normal operation mode (DTX off) is resumed.

In all current GSM speech codecs, an explicit flag is provided in the speech decoder indicating whether the DTX operation mode is on. In the case of other systems, such as the PDC system, where there is not such an explicit flag, the corresponding frame repeating mode is detected in the noise suppressor by comparing input frames to earlier ones and setting up a VOX flag if consecutive frames are very similar.

As mentioned earlier, substitution and muting of a lost speech frame or a lost SID frame can cause some interruption to a continuous harmonious flow of the background noise over the lost frame(s) and lead to an impression of badly decreased fluency in the transmitted signal, an impression that becomes more pronounced if the background noise is loud. This problem is dealt with firstly by adjusting the noise suppression in the lost speech frames and secondly by generating a pseudo residual background noise (PRN) within the algorithm which is then mixed with the attenuated speech frame or SID frame.

The synthetic noise used as a source for the generation of the PRN is generated in the noise suppressor 44 in the frequency domain. Real and imaginary components of a number of FFT bins of the complex comfort noise spectrum are created using a random number generator 354. The resulting spectrum is subsequently scaled or weighted in block 356 according to an estimate of the residual background noise spectrum obtained by scaling the background noise spectrum estimate from block 334 and using the noisy speech and noise level estimates from block 348. The pseudo-random noise spectrum PRN thus generated is then mixed with the repeated and attenuated frame once they have both been suitably scaled. Finally, the artificial noise spectrum is transformed into the time domain via an IFFT 360, and multiplied with a window function 362 and then summed in the time domain with the attenuated repeated original frames in block 364 so that it appropriately fills in the reduction in the residual background noise level caused by the decoder attenuation.

Scaling of the residual background noise estimate is carried out as follows. As mentioned above, the level of attenuation used in the speech decoder for repeated frames in bad frame conditions is determined by comparing the average amplitude of the current frame to that of the latest good speech frame to generate attenuation coefficients. The attenuation coefficients are determined from a ratio of the average power of the repeated frame to a stored value. The average power of the current frame is then stored in the attenuation gain coefficient memory 358.

The complement of the ratio of the average power of the current speech frame to the stored average power of the latest good frame is subsequently used to scale the generated PRN spectrum so that as the residual background noise level is attenuated, the pseudo-random contribution is correspondingly increased.

Summing the residual background noise estimate and the scaled pseudo-random noise produces the enhanced output speech signal y(n) according to the following equation:

$$y(n)=\hat{s}(n)+A\cdot(1-G_{RFA}(n))\upsilon(n), \quad 15$$

where $\hat{s}(n)$ is the speech or comfort noise signal attenuated by the bad frame handler 38 of the speech decoder and processed in noise suppressor 44, $\upsilon(n)$ is the PRN signal and $G_{RFA}(n)$ is the repeated frame attenuation gain coefficient for speech frame n. A is a scaling constant having a value of approximately 1.49. The scaling constant A arises from two contributions. Firstly, the computation of the residual background noise spectrum estimate is originally made using a windowed signal, whereas the random complex spectrum is generated with an assumption of a non-windowed time domain sequence. Secondly, via the IFFT, the energy of the PRN is distributed over all the 128 samples (the length of the FFT) but decreases as the artificial signal is windowed to fit the original signal windowing. On the other hand, the residual background noise spectrum is only computed from 98 input samples of the original signal and 30 zeros (zero padding). Therefore, scaling constant A is used so that the energy of the PRN is not underestimated.

In the GSM Full Rate (FR) speech codec, gradual return from the muted state is controlled with regard to the pseudo-logarithmic encoded block amplitude Xmaxcr of each of four sub-frames of a speech frame. If Xmaxcr exceeds the corresponding sample of a predefined amplitude recovery sequence for any frame during the gradual returning period, it is bounded according to the value of that sample. The occurrence of this condition is flagged to the noise suppressor 44 so as to calculate the scaling factor for the PRN spectrum as described above. Otherwise, no PRN is added to the output during the recovery period.

Although adding generated PRN reduces annoyance caused by a rapidly changing noise level, it also reduces the ability of repeated frame attenuation to inform the user about channel conditions. However, gaps are produced in speech which inform the user of a problem. To be certain that the user is kept informed of degraded channel conditions, a fading mechanism is used in any case. This mechanism switches off the addition of PRN after a short time and thus allows the muted signal to fade away completely. This is achieved by using a frame counter to determine the number of frames during which PRN addition is active without interruption. When the counter exceeds a threshold value, the PRN gain is caused to fade away gradually by decrementing it from 1 to 0 in sufficiently small steps over a predetermined number of frames. In one embodiment of the invention, the fading is started after one second of continuous PRN addition and the fading period is 200 ms.

Figure 5:
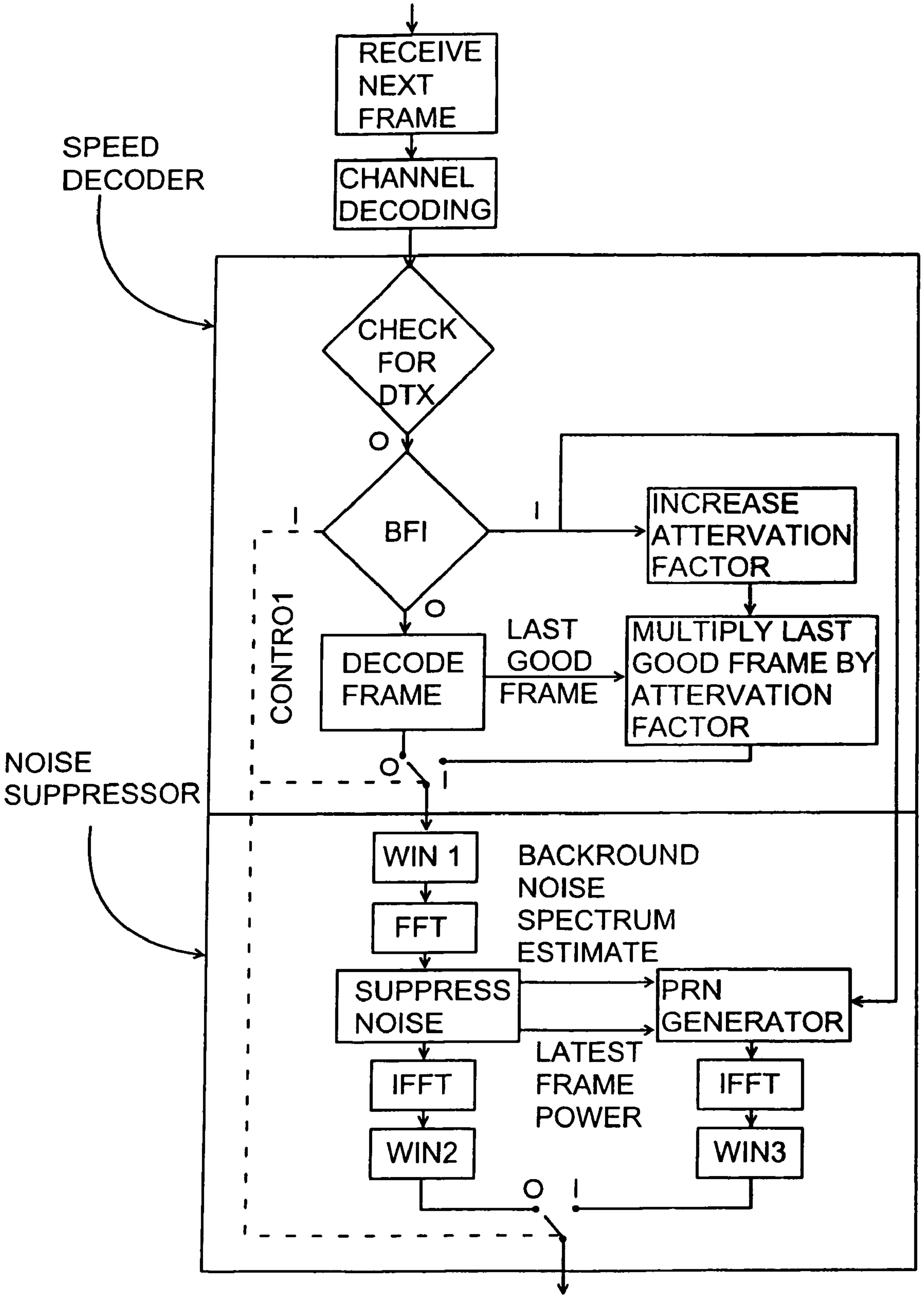
FIG. 5 shows the invention in the form of flowchart.

A flowchart showing the inter-relation of at least some of the inventions is shown in FIG. 5.

Figure 6:
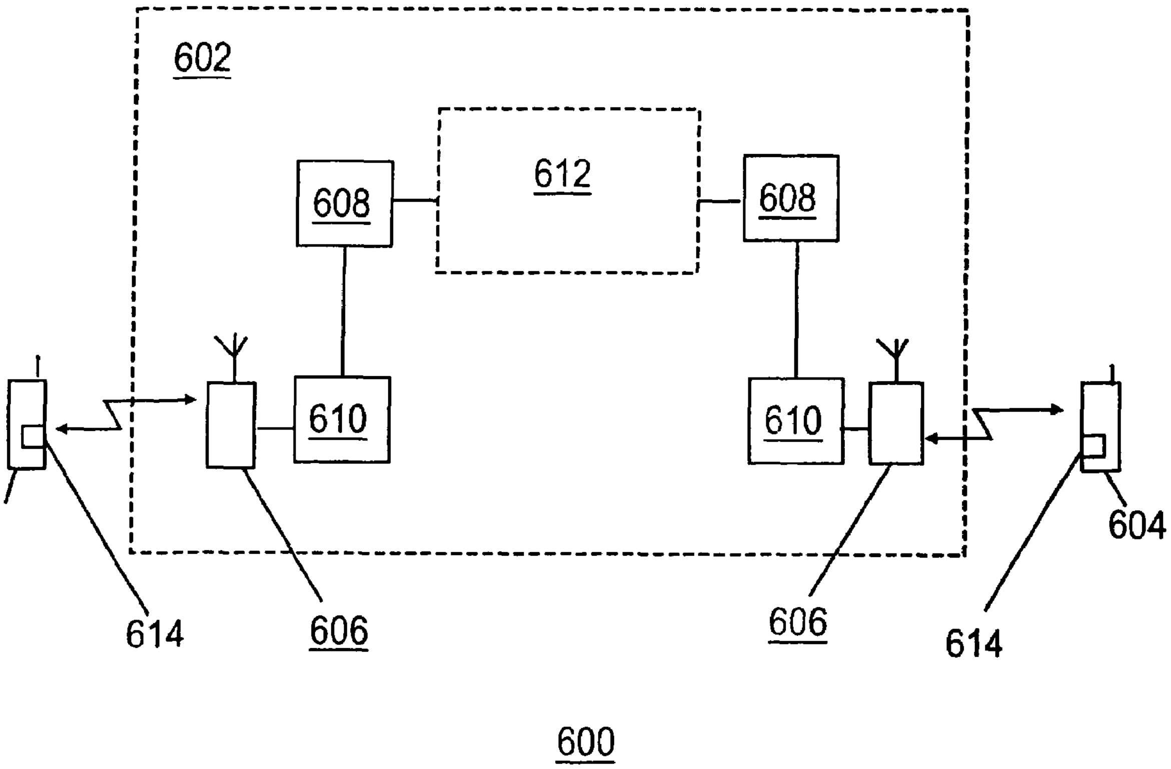
FIG. 6 shows a communications system incorporating the invention.

FIG. 6 shows a mobile communications system 600 comprising a cellular network 602 and mobile terminals 604. The cellular network 602 comprises base transceiver stations (BTS) 606 connected to mobile switching centres (MSC) 608 via transcoder units (TRAU) 610. The MSCs are connected to another network 612 which transmits calls. This may be part of the cellular network 602 are may be a public switched telephone network (PTSN).

The mobile terminals 604 each comprise a noise suppressor 614 to suppress noise both in signal transmitted and signals received by the mobile terminals 604.

When a mobile terminal 604 is used to make a call, it produces a digital signal which is noise suppressed in its noise suppressor 614, speech encoded in its speech encoder and channel encoded in its channel encoder. The encoded signal is then transmitted in an up-link direction to the cellular network 602 where it is received by the base transceiver station 606 and then decoded in the transcoder units 610 back into a digital signal which can be transmitted onward, for example to a PSTN or to another mobile terminal 604. In the latter case, the signal is transmitted in a down-link direction to a transcoder unit 610 where it is encoded again and then transmitted by the base transceiver station 606 to another mobile terminal 604 where it is decoded and then noise suppressed in the noise suppressor 614.

Noise suppressors may be present at other points in the network. For example they can be provided in association with the transcoder units 610 so that they act either on a signal after it has been decoded or on a signal before it has been decoded. In addition to locating noise suppressors in the network 602 in this way, other features of the invention may also be provided in the network. For example, the transcoder units 610 may provide DTX and BFI indications. These may be used by the network noise suppressors to control noise suppression as has been described above.

Furthermore, the transcoder units 610 incorporate the following features of the invention:

a detector to detect and to fill gaps caused by lost frames which have been replaced by repeated and attenuated frames in a previous bad frame handling unit; and control functions to control noise suppression to deal with tandeming considerations.

However, these inventive features, that is the detector and/or the control functions, may also alternatively or additionally be provided in the mobile terminals 604, particularly to deal with a down-link signal.

It should be noted that the various aspects of the invention are independent and can operate independently. Therefore, any one or more of the aspects may be incorporated in the mobile terminal or the network as desired.

If the noise suppressor 44 is used in a down-link connection in which there are variable rate speech codecs, such as those used in the CDMA speech coding standards, additional matters need to be dealt with. The various speech coding bit-rates, activated according to input signal characteristics at the far (that is transmitting) end, produce profoundly different output speech and noise signals. Moreover, some attenuation of the output signal level is typically applied at the lowest bit-rate and this produces a signal that essentially can be regarded as a kind of comfort noise. Thus, successful application of the down-link noise suppressor in conjunction with a variable rate speech codec requires:

1. Using several background noise spectrum estimates corresponding to each of the available speech coding bit-rates;
2. Using dedicated parameter sets for power estimate updating and attenuation gain computation in conjunction with each of the available bit-rates;
3. Using different gain computation in conjunction with the available bit-rates;
4. Using information about any level attenuation applied to signals coded at low bit-rates.

In a system that employs a variable rate speech codec, it is preferable to use information about the used speech coding bit-rate provided by the speech decoder for the noise suppressor to operate effectively.

An intention of the present invention is to make noise suppression feasible when desired as a post-processing stage for a speech decoder. For this purpose, the noise suppressor uses information from the speech codec concerning its status (DTX) and the status of the channel.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A noise suppression stage to act on a signal, the noise suppression stage comprising:

a first windowing block configured to weight the signal by a first window function having a first length;

a transformer configured to transform the signal from a time domain to a frequency domain;

a block configured to modify the weighted signal in the frequency domain;

a transformer configured to transform the signal from the frequency domain into the time domain; and a second windowing block configured to weight the signal by a second window function having a second length, wherein the first length of the first window function is different from the second length of the second window function.

2. A noise suppression stage according to claim 1 in which the first windowing block and the second windowing are adapted to weight decoded speech.

3. A noise suppression stage according to claim 1 in which the window functions have a trapezoidal shape having a leading slope and a trailing slope.

4. A noise suppression stage according to claim 1 in which the first window function has a leading slope having a gradient which is shallower than that of the leading slope of the second window function.

5. A noise suppression stage according to claim 1 in which the first window function has a trailing slope having a gradient which is shallower than that of the trailing slope of the second window function.

6. The noise suppression stage of claim 1 wherein the second window function has a shape that is different from a shape of the first window function.

7. The noise suppression stage of claim 1 wherein a leading slope of the first window function is different from a leading slope of the second window function.

8. The noise suppression stage of claim 1 wherein a trailing slope of the first window function is different from a trailing slope of the second window function.

9. The noise suppression stage of claim 1 wherein the second length of the second window function is shorter than the first length of the first window function.

10. A two phase windowing method for noise suppression comprising:

weighting a signal in the time domain by a first window function, having a first length, to produce a frame;

transforming the frame into the frequency domain;

modifying the frame in the frequency domain;

transforming the frame back into the time domain; and weighting the frame by a second window function having a second length, wherein the first length of the first window function is different than the second length of the second window function.

11. A method according to claim 10 in which the weighting is applied to decoded speech.

12. A method according to claim 10 in which the first window function and the second window function have a trapezoidal shape having a leading slope and a trailing slope.

13. A method according to claim 10 in which the first window function has a leading slope having a gradient which is shallower than that of a leading slope of the second window function.

14. A method according to claim 10 in which the first window function has a trailing slope having a gradient which is shallower than that of a trailing slope of the second window function.

15. The method of claim 10 wherein the second length of the second window function is shorter than the first length of the first window function.

16. A mobile terminal comprising a noise suppression stage to act on a signal, the noise suppression stage comprising:

a first windowing block configured to weight the signal by a first window function comprising a first length;

a transformer configured to transform the signal from a time domain into a frequency domain;

a block configured to modify the weighted signal in the frequency domain;

a transformer configured to transform the signal from a frequency domain into the time domain and;

a second windowing block configured to weight the signal by a second window function comprising a second length, wherein the first length of the first windowing block is not the same as the second length of the second windowing function.

17. A mobile terminal according to claim 16 in which the first window and the second windowing block are adapted to weight decoded speech.

18. A mobile terminal according to claim 16 in which the first window and the second window functions have a trapezoidal shape having a leading slope and a trailing slope.

19. A mobile terminal according to claim 16 in which the first window function has a leading slope having a gradient which is shallower than that of a leading slope of the second window function.

20. A mobile terminal according to claim 16 in which the first window function has a trailing slope having a gradient which is shallower than that of a trailing slope of the second window function.

21. The mobile terminal of claim 16 wherein the second length of the second window function is shorter than the first length of the first window function.

22. A communications system comprising a communications network having a noise suppression stage to act on a signal and a plurality of communications terminals, the noise suppression stage comprising:

a first windowing block configured to weight the signal by a first window function having a first length;

a transformer configured to transform the signal from a time domain into a frequency domain;

a noise suppressor configured to suppress noise in the signal;

a transformer configured to transform the signal from the frequency domain into the time domain; and a second windowing block configured to weight the signal by a second window function having a second length, wherein the second length and the first length are different.

23. A communications system according to claim 22 in which the first windowing block and the second windowing block are adapted to weight decoded speech.

24. A communications system according to claim 22 in which the first window function and the second window function have a trapezoidal shape having a leading slope and a trailing slope.

25. A communications system according to claim 22 in which the first window function has a leading slope having a gradient which is shallower than that of a leading slope of the second window function.

26. A communications system according to claim 22 in which the first window function has a trailing slope having a gradient which is shallower than that of a trailing slope of the second window function.

27. The communication system of claim 22 wherein the second length of the second window function is shorter than the first length of the first window function.

28. A network element comprising a noise suppression stage to act on a signal, the noise suppression stage comprising:

a first windowing block configured to weight the signal by a first window function having a first length;

a transformer configured to transform the signal from a time domain into a frequency domain;

a block configured to modify the weighted signal in the frequency domain;

a transformer configured to transform the signal from the frequency domain into the time domain; and a second windowing block configured to weight the signal by a second window function having a second length, wherein the first length of the first windowing function and the second length of the second windowing function are not the same.

29. The network element of claim 28 wherein the second length of the second window function is shorter than the first length of the first window function.

* * * * *